US011689766B2

(12) United States Patent
Doggett et al.

(10) Patent No.: US 11,689,766 B2
(45) Date of Patent: Jun. 27, 2023

(54) TECHNIQUES FOR PERSONALIZING THE PLAYBACK OF A MEDIA TITLE BASED ON USER INTERACTIONS WITH AN INTERNET OF THINGS DEVICE

(71) Applicant: DISNEY ENTERPRISES, INC., Burbank, CA (US)

(72) Inventors: Erika Varis Doggett, Los Angeles, CA (US); Michael P. Goslin, Sherman Oaks, CA (US); Douglas A. Fidaleo, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 8 days.

(21) Appl. No.: 17/202,189

(22) Filed: Mar. 15, 2021

(65) Prior Publication Data
US 2022/0070532 A1 Mar. 3, 2022

Related U.S. Application Data

(60) Provisional application No. 63/071,856, filed on Aug. 28, 2020.

(51) Int. Cl.
*H04N 21/442* (2011.01)
*H04N 21/84* (2011.01)
(Continued)

(52) U.S. Cl.
CPC ... *H04N 21/44224* (2020.08); *G06F 18/2411* (2023.01); *G06N 3/045* (2023.01);
(Continued)

(58) Field of Classification Search
CPC ....... H04N 21/44224; H04N 21/44204; H04N 21/8133; H04N 21/84; G06K 9/6269; G06N 3/0454
(Continued)

(56) References Cited

U.S. PATENT DOCUMENTS

| 2014/0080109 A1* | 3/2014 | Haseltine | A63F 13/40 434/308 |
| 2016/0098998 A1* | 4/2016 | Wang | G06F 16/433 704/246 |

(Continued)

OTHER PUBLICATIONS

Ali, et al.; Golden Path Analyzer: Using Divide-and-Conquer to Cluster Web Clickstreams; date unknown; 10 pages.

(Continued)

*Primary Examiner* — Alfonso Castro
(74) *Attorney, Agent, or Firm* — Artegis Law Group, LLP

(57) ABSTRACT

In various embodiments, an interactive streaming application plays back a media title via a client device. In operation, while a client device plays back a first chunk of the media title, the interactive streaming application determines a first movement of an internet of things ("IoT") device. The interactive streaming application then determines, from multiple target states, a target state that is associated with the first movement. Based on the target state, the interactive streaming application determines that a second chunk of the media title should be a next chunk of the media title that is streamed to the client device for playback. The interactive streaming application then causes the second chunk of the media title to be streamed to the client device. Advantageously, the interactive streaming application can automatically personalize the playback of the media title for a user based, at least in part, on movements of the IoT device.

20 Claims, 5 Drawing Sheets

(51) Int. Cl.
*H04N 21/81* (2011.01)
*G06F 18/2411* (2023.01)
*G06N 3/045* (2023.01)

(52) U.S. Cl.
CPC ... *H04N 21/44204* (2013.01); *H04N 21/8133* (2013.01); *H04N 21/84* (2013.01)

(58) Field of Classification Search
USPC .......................................................... 725/14
See application file for complete search history.

(56) References Cited

U.S. PATENT DOCUMENTS

| | | | |
|---|---|---|---|
| 2018/0093181 A1* | 4/2018 | Goslin | A63H 33/00 |
| 2018/0374251 A1* | 12/2018 | Mitchell | G06T 19/20 |
| 2019/0134501 A1* | 5/2019 | Feder | A63F 13/42 |
| 2019/0197106 A1* | 6/2019 | Doggett | G10L 15/22 |

OTHER PUBLICATIONS

Ji, et al.; 3D Convolutional Neural Networks for Human Action Recognition; dated 2010; 8 pages.
Wang, et al.; Action Recognition with Improved Trajectories; dated 2013; 8 pages.
Simonyan, et al.; Two-Stream Convolutional Networks for Action Recognition in Videos; dated Nov. 12, 2014; 11 pages.
Donahue, et al.; Long-term Recurrent Convolutional Networks for Visual Recognition and Description; dated May 31, 2016; 14 pages.
Rohit Ghosh; Qure.ai Blog; Revolutionizing healthcare with deep learning; Deep Learning for Videos: A 2018 Guide to Action Recognition; dated Jun. 11, 2018; 25 pages.

* cited by examiner

TECHNIQUES FOR PERSONALIZING THE PLAYBACK OF A MEDIA TITLE BASED ON USER INTERACTIONS WITH AN INTERNET OF THINGS DEVICE

CROSS-REFERENCE TO RELATED APPLICATIONS

This application claims priority benefit of the United States Provisional patent application titled, "Techniques for Personalizing the Playback of a Media Title Based on User Interactions with an Internet of Things Device," filed on Aug. 28, 2020 and having Ser. No. 63/071,856. The subject matter of this related application is hereby incorporated herein by reference.

BACKGROUND

Field of the Various Embodiments

The various embodiments relate generally to computer science and communications technology and, more specifically, to techniques for personalizing the playback of a media title based on user interactions with an internet of things device.

Description of the Related Art

A media streaming service typically provides access to a library of media titles that can be played back on a range of different client devices. In many implementations, to playback a requested media title via a given client device, the media streaming service sequentially transmits discrete portions or "chunks" of the requested media title over a connection to the client device in accordance with the storyline or "narrative" associated with the media title. To reduce the likelihood of a temporary degradation in the connection causing a playback interruption, a playback application executing on the client device usually stores or "buffers" multiple chunks of the requested media title before initiating the playback of the requested media title in order to prevent occurrences of buffer underrun.

Most media titles have predetermined narratives that are specified as a linear ordering of the chunks in the media title from a beginning chunk to an end chunk. In general, the narrative of a given media title is designed to appeal to the majority of likely users (i.e., the likely audience for the media title). For example, an action film could have a relatively short introduction or "exposition" and a relatively long climax, while a drama film could have a relatively long exposition and a relatively short climax. One problem associated with providing a predetermined narrative for a media title is that some users may have individual preferences for which the narrative is not designed. For example, a given user could become bored during the playback of the exposition portion of a media title that the vast majority of users find engrossing.

Because of mismatches between narratives and individual preferences, users oftentimes resort to manually overriding the playback of various portions of given media titles. For example, a user could use a fast-forward button to skip over a particular portion of the media title. In response to fast-forward and other types of navigation commands, a streaming media provider usually determines a "resumption" chunk from which to resume playback of the media title being played back by the user. Beginning with the resumption chunk, the streaming media provider resumes sequentially transmitting chunks of the requested media title to the client device in accordance with the media title narrative. After receiving the resumption chunk and enough subsequent chunks to re-build the reserve of stored or "buffered" chunks, playback of the media title is resumed.

One drawback of manually overriding the playback of a media title is that the associated playback delays can substantially degrade the overall quality of the playback experience. Referring back to the above example, if a user were to fast forward and skip a portion of a media title, then there could be a resulting playback delay of up to ten seconds, while the playback application rebuilds or "re-buffers" the reserve of stored chunks, beginning with the resumption chunk. Another drawback associated with manually overriding a playback of a media title is that a user can inadvertently skip a plot twist or other essential aspect of the narrative, which can reduce the overall quality of the media title in the mind of the user.

As a general matter, personalizing playback experiences is desirable because doing so is a way to potentially increase overall audiences for media titles. However, allowing users to change the order of the chunks of the media titles being played back involves largely manual processes, which, as noted above, can cause essential aspects of narratives to be inadvertently skipped, thereby reducing overall playback experience quality.

As the foregoing illustrates, what is needed in the art are more effective techniques for playing back media titles to users.

SUMMARY

One embodiment of the present invention sets forth a computer-implemented method for playing back a media title. The method includes determining a first movement of an internet of things ("IoT") device, while a client device plays back a first chunk of the media title; determining, from multiple target states, a first target state that is associated with the first movement; determining, based on the first target state, a second chunk of the media title that should be a next chunk of the media title streamed to the client device for playback; and in response to determining that the second chunk should be the next chunk of the media title to be streamed to the client device for playback, causing the second chuck of the media title to be streamed to the client device At least one technical advantage of the disclosed techniques relative to the prior art is that, with the disclosed techniques, the playback of a given media title can be personalized automatically for different users to reflect individual preferences of those users. In particular, the disclosed techniques can be implemented to automatically modify a default narrative based on movements of the IoT device to personalize the playback of a media title without interrupting playback. Further, the playback of the media title can be personalized any number of times during playback. Consequently, the overall quality of the playback experience for a given media title can be increased across a broad range of users. Further, because playback is personalized based on various target states that correlate to user interest, the disclosed techniques also can increase the perceived quality of a media title in the minds of users. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
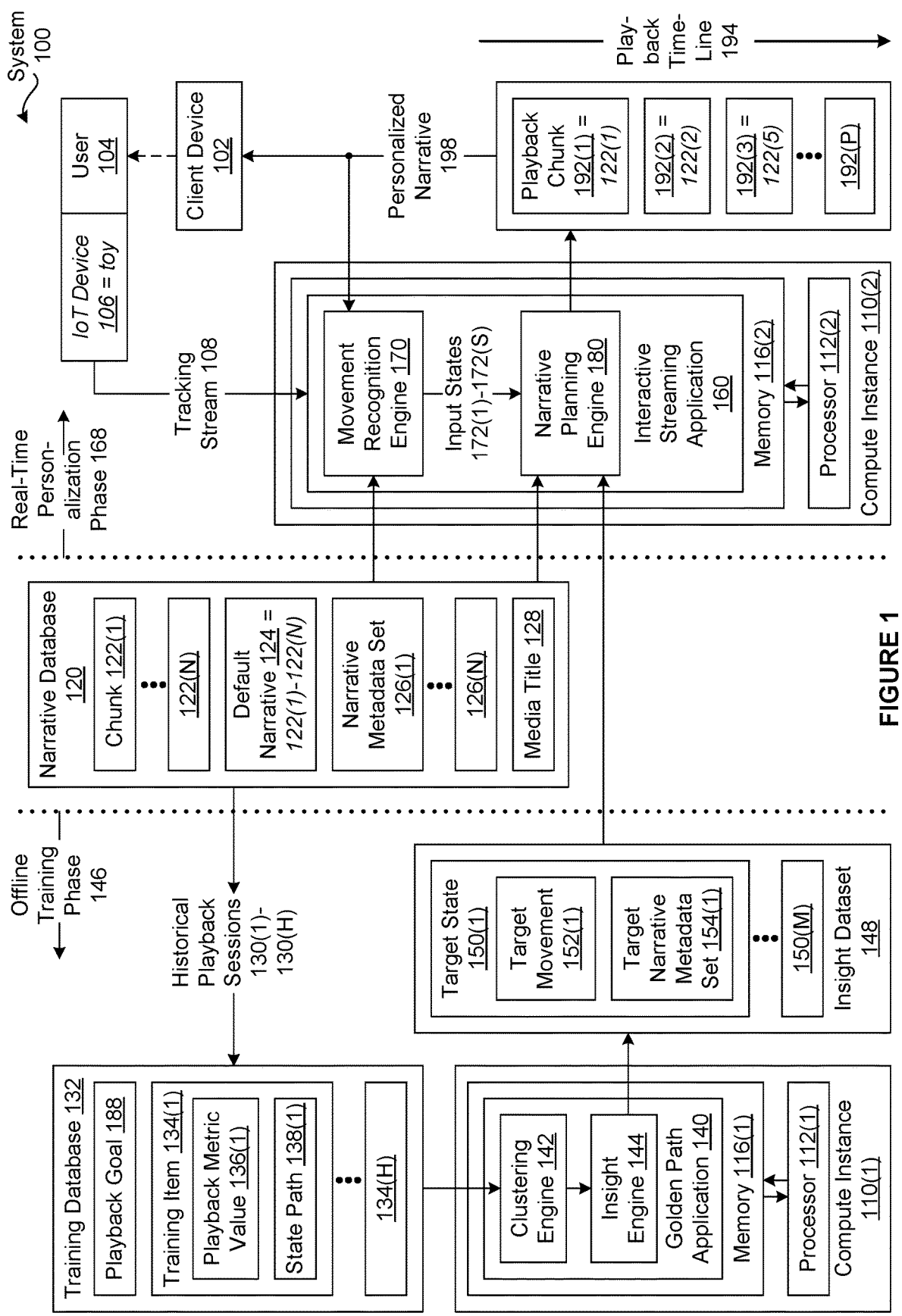
FIG. 1 is a conceptual illustration of a system configured to implement one or more aspects of the various embodiments.

FIG. 1 is a conceptual illustration of a system 100 configured to implement one or more aspects of the various embodiments. As shown, the system 100 includes, without limitation, a compute instance 110(1), a compute instance 110(2), a narrative database 120, a training database 132, a client device 102, and an internet of things ("IoT") device 106. The compute instance 110(1) and the compute instance 110(2) are also referred to herein individually as "the compute instance 110" and collectively as "the compute instances 110."

For explanatory purposes, multiple instances of like objects are denoted with reference numbers identifying the object and parenthetical alphanumeric character(s) identifying the instance where needed. Also, for explanatory purposes, multiple snapshots of a single object, where each snapshot is associated with a different point in time, are denoted with reference numbers identifying the object and a parenthetical number identifying the point in time where needed.

Any number of the components of the system 100 can be distributed across multiple geographic locations or implemented in one or more cloud computing environments (i.e., encapsulated shared resources, software, data, etc.) in any combination. In some embodiments, the system 100 can include any number of compute instances 110, any number of narrative databases 120, any number of training databases 132, any number of client devices 102, and any number of IoT devices 106, or any combination thereof. In the same or other embodiments, each of the compute instances 110 can be implemented in a cloud computing environment, implemented as part of any other distributed computing environment, or implemented in a stand-alone fashion.

As shown, the compute instance 110(1) includes, without limitation, a processor 112(1) and a memory 116(1), and the compute instance 110(2) includes, without limitation, a processor 112(2) and a memory 116(2). The processors 112(1) and 112(2) are also referred to herein individually as "the processor 112" and collectively as "the processors 112." The memories 116(1) and 116(2) are also referred to herein individually as "the memory 116" and collectively as "the memories 116."

Each of the processors 112 can be any instruction execution system, apparatus, or device capable of executing instructions. For example, each of the processors 112 could comprise a central processing unit, a graphics processing unit, a controller, a micro-controller, a state machine, or any combination thereof. The memory 116 of each of the compute instances 110 stores content, such as software applications and data, for use by the processor 112 of the compute instance 110. In some alternate embodiments, each of any number of compute instances 110 can include any number of processors 112 and any number of memories 116 in any combination. In particular, any number of the compute instances 110 (including one) can provide a multiprocessing environment in any technically feasible fashion.

The memory 116 can be one or more of a readily available memory, such as random-access memory, read only memory, floppy disk, hard disk, or any other form of digital storage, local or remote. In some embodiments, a storage (not shown) can supplement or replace the memory 116. The storage can include any number and type of external memories that are accessible to the processor 112. For example, and without limitation, the storage can include a Secure Digital Card, an external Flash memory, a portable compact disc read-only memory, an optical storage device, a magnetic storage device, or any suitable combination of the foregoing.

In general, each of the compute instances 110 is configured to implement one or more software applications. For explanatory purposes only, each software application is described as residing in the memory 116 of one of the compute instances 110 and executing on a processor 112 of the compute instance 110. However, in some alternate embodiments, the functionality of each software application can be distributed across any number of other software applications that reside in the memories 116 of any number of compute instances 110 and execute on the processors 112 of any number of compute instances 110 in any combination. Further, the functionality of any number of software applications can be consolidated into a single software application.

In particular, the compute instance 110(2) is configured to stream a media title 128 to the client device 102. The media title 128 can be any associated with any amount and/or types of media content in any technically feasible fashion. For instance, in some embodiments, the media title 128 can be a feature-length film, a short film, an episode of a show, a recording of a sports event, a recording of a music event, an audio-only interactive podcast, and so forth. In some embodiments, the compute instance 110(2) streams the media title 128 and/or any number of other media titles 128 to any number of client devices 102 in any combination.

As shown, the media title 128 is associated with chunks 122(1)-122(N), where N can be any positive integer. The chunks 122(1)-122(N) are also referred to herein individually as "the chunk 122" and collectively as "the chunks 122." Each of the chunks 122 is a discrete portion of media content that can include, without limitation, any amount (including none) of visual content and any amount (including none) of audio content in any combination. In some embodiments, the media content included in each of the chunks 122 is organized as a sequence of frames of media content, and the total number of frames in each of the chunks 122 may vary. In some embodiments, each of the chunks 122 is a different shot that includes, without limitation, any number of frames captured continuously from a given camera or other capture point.

The client device 102 can be any device that is capable of receiving and playing back the chunks 122. For example, the client device 102 can be a desktop computer, a laptop computer, a tablet, a smartphone, a game console, a television, etc. The client device 102 can receive and playback the chunks 122 in any technically feasible fashion. In some embodiments, the compute instance 110 sequentially transmits the chunks 122 over a connection to the client device 102.

As shown, the media title 128 is played back for a user 104 via the client device 102. As used herein, when the media title 128 is "played back" for the user 104, any portion(s) of one or more chunks 122 associated with the media title 128 are played back via the client device 102 such that the user 104 can view and/or listen to the portion(s) of the one or more chunks 122. In some alternate embodiments, the media title 128 can be played back for any number of users 104 via the client device 102. In the same or other alternate embodiments, any number of media titles 128 can be played back for any number of users 104 via any number of client devices 102 during any number of playback sessions. As referred to herein, each playback session is associated with a different request to playback the media title 128.

In some embodiments, the client device 102 includes, without limitation, a playback application (not shown). The playback application resides and executes on the client device 102 and can playback media content (e.g., the chunks 122) using any number and/or types of playback devices that are accessible to the client device 102. To reduce the likelihood of a temporary degradation in the connection to the compute instance 110 causing a playback interruption, the playback application usually stores or "buffers" multiple chunks 122 of the media title 128 before initiating the playback of the media title 128 in order to prevent occurrences of buffer underrun.

As described previously herein, most media titles have predetermined narratives that are specified as a linear ordering of the chunks in the media title from a beginning chunk to an end chunk. One problem associated with providing a predetermined narrative for a media title is that some users may have individual preferences for which the narrative is not designed. Because of mismatches between narratives and individual preferences, users oftentimes resort to manually overriding the playback of various portions of given media titles. One drawback of manually overriding the playback of a media title is that the associated playback delays can substantially degrade the overall quality of the playback experience. Another drawback associated with manually overriding a playback of a media title is that a user can inadvertently skip a plot twist or other essential aspect of the narrative, which can reduce the overall quality of the media title in the mind of the user.

Dynamically Personalizing Playback of a Media Title

To increase the overall quality of the playback experience and/or the perceived quality of the media title 128 in the mind of user 104, the compute instance 110(1) implements a golden path application 140, and the compute instance 110(2) implements an interactive streaming application 160.

As shown, during an offline training phase 146, the golden path application 140 generates an insight dataset 148 based on the training database 132. In some embodiments, the training database 132 is associated with both the narrative database 120 and historical playback sessions 130(1)-130(H), where H is any positive integer greater than 1. Subsequently, during a real-time personalization phase 168, the interactive streaming application 160 personalizes the playback of the media title 128 for the user 104 based on the narrative database 120, the insight dataset 148, and interactions between the user 104 and the IoT device 106.

As shown, the narrative database 120 includes, without limitation, the chunks 122(1)-122(N), a default narrative 124, narrative metadata sets 126(1)-126(N), and the media title 128. The default narrative 124 specifies, without limitation, a sequence of any number of the chunks 122 in any combination and/or order. In some embodiments, the default narrative 124 is a predetermined linear narrative. For instance, and as depicted in italics, in some embodiments, the default narrative 124 specifies, sequentially, the chunks 122(1)-122(N).

The narrative metadata sets 126(1)-126(N) are associated with the chunks 122(1)-122(N), respectively. The narrative metadata sets 126(1)-126(N) are also referred to herein individually as "the narrative metadata set 126" and collectively as "the narrative metadata sets 126." The narrative metadata set 126(n), for n is an integer from 1 to N, specifies, without limitation, any number of characteristics of the chunk 122(n). In some embodiments, any number of characteristics may be specified using nomenclature that is consistent across different media titles 128, different users 104, different IoT devices 106, or any combination thereof. As persons skilled in the art will recognize, using consistent nomenclature increases the scalability of the golden path application 140 and the interactive streaming application 160 across different media titles 128, different users 104, different IoT devices 106, or any combination thereof.

For instance, in some embodiments, the narrative metadata set 126(n) includes, without limitation, a narrative label (not shown) specifying a part of a narrative, such as a "start of exposition," that characterizes the chunk 122(n). In the same or other embodiments, the narrative metadata set 126(n) includes, without limitation, a genre that characterizes the chunk 122(n). Some examples of genres are, without limitation, horror, romance, comedy, action, drama, etc.

In some embodiments, the narrative metadata set 126(n) includes, without limitation, any amount of chronological data that characterizes the chunk 122(n) with respect to an overall chronology associated with the media title 128. In some such embodiments, the chronological data includes, without limitation, any number of chronological points in time associated with the media title 128. For example, the narrative metadata set 126(n) could specify, without limitation, the days during which the events depicted in the chunk 122(n) occur with respect to a chronology associated with the events depicted across the chunks 122.

In some embodiments, during each of the historical playback sessions 130(1)-130(H), at least a portion of the chunks 122 are played back in any order via a different device (e.g., a laptop computer) to playback the media title 128 for a different user. As chunks 122 are played back for each user, the user can physically move a different tracked device. Each of the tracked devices can be any physical object for which the physical location is tracked over time in any technically feasible fashion.

The training database 132 can include, without limitation, any amount of information associated with the historical playback sessions 130(1)-130(H) that is relevant to determining any number and/or types of correlations between the playback experiences of the users, the chunks 122, and the tracked devices. As shown, in some embodiments, the training database 132 includes, without limitation, a playback goal 188 and training items 134(1)-134(H). The playback goal 188 can be any type of goal that is relevant to the playback experience. In some embodiments, the playback goal 188 correlates to user interest in the media title 128. For instance, in some embodiments, the playback goal 188 is that a user plays back the media title 128 for a predetermined length of time (e.g., for at least twenty-five minutes).

As shown, the training item 134(1) includes, without limitation, a playback metric value 136(1) and a state path 138(1). Similarly, and although not shown, the training items 134(2)-134(H) include, without limitation, playback metric values 136(2)-136(H), respectively, and state paths 138(2)-138(H), respectively. The playback metric values 136(1)-136(H) specify values for a playback metric (not shown) associated with the playback goal 188. For instance, in some embodiments, the playback metric values 136(1)-136(H) specify the lengths of time that the user plays back the media title 128 during the historical playback sessions 130(1)-130(H), respectively.

The state paths 138(1)-138(H) specify sequences of training states (not shown) that span from the beginning to the end of the historical playback sessions 130(1)-130(H), respectively. The state paths 138(1)-138(H) are also referred to herein individually as "the state path 138" and collectively as "the state paths 138." Each of the training states included in the state path 138(h), where h is an integer from 1 to H, is associated with a different, nonoverlapping, time interval during the historical playback session 130(h). Each training state includes, without limitation, the narrative metadata set 126 associated with the chunk 122 played back at the associated time interval during the associated historical playback session 130 and a movement of the associated tracked device during the same time interval.

The state paths 138(1)-138(H) can be generated based on the narrative database 120 and the physical locations of the tracked devices in any technical feasible fashion. In some embodiments, any number of instances (not shown) of a movement recognition engine 170 generate the state paths 138(1)-138(H). The movement recognition engine 170 is described below in conjunction with the interactive streaming application 160.

As shown, the golden path application 140 generates the insight dataset 148 based on the training database 132. In some embodiments, the golden path application 140 resides in the memory 116(1) of the compute instance 110(1) and executes on the processor 112(1) of the compute instance 110(1). In some other embodiments, the functionality of the golden path application 140 can be distributed across any number of software applications that reside in any number of the memories 116 of any number of the compute instances 110 and execute on any number of the processors 112 of any number of the compute instances 110 in any combination. In some embodiments, the golden path application 140 includes, without limitation, a clustering engine 142 and an insight engine 144.

The clustering engine 142 generates any number of clusters (not shown) based on the training database 132 in any technically feasible fashion. In some embodiments, the clustering engine 142 filters the state paths 138(1)-138(H) based on the playback goal 188 and the playback metric values 136(1)-136(H), respectively, to generate a successful subset (not shown) of the state paths 138. Each of the state paths 138 included in the successful subset is associated with a different one of the historical playback sessions 130 that achieved the playback goal 188. The clustering engine 142 applies any number and/or type of clustering algorithms to the successful subset of the state paths 138 to generate any number of clusters (not shown).

Each of the clusters includes, without limitation, a different state path 138 that is an associated cluster seed and any number (including zero) of the state paths 138 that are supersets of the cluster seed. In some embodiments, the clustering engine 142 sequentially assigns each of the state paths 138 included in the successful subset to at most one cluster. For instance, in some embodiments, at least the state paths 138(1) and 138(2) are included in the successful subset, and the clustering engine 142 generates a first cluster that includes a first cluster seed initialized to the state path 138(1). Subsequently, if the state path 138(2) is a superset of the first cluster seed (i.e., the state path 138(1)), then the clustering engine 142 adds the state path 138(2) to the first cluster. If, however, the state path 138(2) is a subset of the first cluster seed (i.e. the state path 138(1)), then the clustering engine 142 updates the first cluster seed to the state path 138(2) that is newer and shorter than the state path 138(1). Note that the state path 138(1) is still included in the first cluster but is a superset of the updated first cluster seed. If, however, the state path 138(2) is neither a superset nor a subset of the first cluster seed (i.e., the state path 138(1)), then the clustering engine 142 generates a second cluster that includes a second cluster seed initialized to the state path 138(2).

In the same or other embodiments, the clustering engine 142 omits any number of the state paths 138 included in the successful subset from the clusters, for any a priori reason (for example, if a successful state path exceeds a total length cap). In some embodiments, the clustering engine 142 can generate any number and/or types of clusters based on the training database 132 in any technically feasible fashion.

In some embodiments, the insight engine 144 generates the insight dataset 148 based on the clusters. For each of the clusters, the insight engine 144 selects any number of the training states based on a prevalence of the training states among the state paths 138 assigned to the cluster. For instance, in some embodiments, the insight engine 144 selects each of the training states that is shared by at least a predetermined number of the state paths 138 assigned to the cluster. The insight engine 144 deduplicates the selected training states and generates the insight dataset 148 based on the remaining selected training states. More specifically, the insight engine 144 generates the insight dataset 148 that includes, without limitation, target states 150(1)-150(M), where M is the total number of remaining selected training states and can be any positive integer greater than 1. The target states 150(1)-150(M) are also referred to herein individually as "the target state 150" and collectively as the "target states 150."

As shown, the target state 150(1) includes, without limitation, a target movement 152(1) and a target narrative metadata set 154(1). Although not shown, the target states 150(2)-150(M) includes, without limitation, target movements 152(2)-152(M), respectively, and target narrative metadata sets 154(2)-154(M), respectively. The target movements 152(1)-152(M), are also referred to herein individually as "the target movement 152" and collectively as the "target movements 152." The target narrative metadata sets 154(1)-154(M), are also referred to herein individually as "the target narrative metadata set 154" and collectively as the "target narrative metadata sets 154."

Each of the target states 150 is associated with a different training state. For the target state 150(*m*), where m is an integer from 1 to M, the target movement 152(*m*) is equal to the training movement of the associated training state, and the target narrative metadata set 154(*m*) is equal to the training narrative metadata set of the associated training state. Notably, each of the target states 150 is associated with at least one of the historical playback sessions 130 that achieved the playback goal 188.

In some other embodiments, the insight engine 144 can generate the insight dataset 148 that represents any number and/or types of correlations between the movements of the tracked devices and the narrative metadata sets 126 in any technically feasible fashion. For instance, in some embodiments, the insight engine 144 analyzes the clusters to determine any number of training states and/or any number and/or lengths of sequences of training states that are prevalent with the state paths 138 associated with the historical playback sessions 130 that achieved the playback goal 188. The insight engine 144 then generates the insight dataset 148 that includes, without limitation, any number of target states and any number of sequences of target states.

In the same or other embodiments, the insight engine 144 can perform any number and/or types of analysis operations on each of the clusters to identify inflection points that are consistent across all or a majority of the state paths 138 included in the cluster. For example, the insight engine 144 could identify one of the target states 150 that is consistent across a majority of state paths 138 included in the cluster as an inflection point leading to the achievement of the playback goal 188. For explanatory purposes only, a final inflection point at which the playback goal 188 is achieved is also referred to herein as "a completion point." For instance, in some embodiments, if a cluster includes the state paths 138(1)-138(3) of {A>B>D>goal}, {A>C>D>goal}, and {A>D>goal}, respectively, then the insight engine 144 identifies state D as a completion point, since as per every state path 138 in the cluster, once the associated user reaches state D, the user also continues to complete the goal. In the same or other embodiments, if a cluster includes the state paths 138(1)-138(3) of {A>B>C>D>E>goal}, {A>B>C>E>goal}, and {A>C>B>E>B>goal}, respectively, then the insight engine 144 identifies state E as an inflection point, indicative of eventually reaching the goal, although state E is not an immediate precursor of the goal in every state path 138 in the cluster. The insight engine 144 can specify the inflection points and/or the completion points in the insight dataset 148 in any technically feasible fashion. For instance, the insight engine 144 can add any number of the training states to the insight dataset 148 as completion points.

Subsequently, during the real-time personalization phase 168, the interactive streaming application 160 generates the personalized narrative 198 based on the narrative database 120, the insight dataset 148, and a tracking stream 108 associated with the IoT device 106. In some embodiments, the interactive streaming application 160 resides in the memory 116(2) of the compute instance 110(2) and executes on the processor 112(2) of the compute instance 110(2). In some other embodiments, the functionality of the interactive streaming application 160 can be distributed across any number of software applications that reside in any number of the memories 116 of any number of the compute instances 110 and execute on any number of the processors 112 of any number of the compute instances 110 in any combination. In some embodiments, the interactive streaming application 160 includes, without limitation, a narrative planning engine 180 and a movement recognition engine 170.

When the interactive streaming application 160 receives a request to playback the media title 128 via the client device 102, the interactive streaming application 160 acquires the narrative database 120 that is associated with the media title 128. The interactive streaming application 160 can acquire the narrative database 120 in any technically feasible fashion. For instance, in some embodiments, the narrative database 120 is stored in a media library (not shown), and the interactive streaming application 160 retrieves the narrative database 120 from the media library.

To playback the media title 128 for the user 104, the interactive streaming application 160 causes the narrative planning engine 180 to incrementally generate the personalized narrative 198. In some embodiments, the narrative planning engine 180 initializes the personalized narrative 198 to an empty sequence, initializes a planned narrative (not shown in FIG. 1) to the default narrative 124, and initializes a playback index (not shown in FIG. 1) to zero. The narrative planning engine 180 then increments the playback index to one, sets a playback chunk 192(1) equal to the chunk 122 at the playback index in the planned narrative, and adds the playback chunk 192(1) to the personalized narrative 198. Importantly, and as described in greater detail below, the narrative planning engine 180 can modify the planned narrative in real-time based on interactions between the user 104 and the IoT device 106.

Subsequently, the narrative planning engine 180 increments the playback index to two, sets a playback chunk 192(2) equal to the chunk 122 at the playback index in the planned narrative, and adds the playback chunk 192(2) to the personalized narrative 198. The narrative planning engine 180 continues in this fashion until the interactive streaming application 160 or the narrative planning engine 180 determines to stop playing back the media title 128. Accordingly, the length of the personalized narrative 198 increases over time.

The interactive streaming application 160 or the narrative planning engine 180 can determine to stop playing back the media title 128 in any technically feasible fashion. In some embodiments, the interactive streaming application 160 or the narrative planning engine 180 determines to stop playing back the media title 128 when the playback of the media title 128 is complete or the interactive streaming application 160 or the narrative planning engine 180 is terminated (e.g., by the user 104 or the client device 102)

For explanatory purpose only, the personalized narrative 198 is depicted in FIG. 1 at a point in time when the playback of the media title 128 is complete. In some embodiments, the personalized narrative 198 includes, without limitation, the playback chunks 192(1)-192(P), where P can be any positive integer greater than 1. The playback chunks 192(1)-192(P) are also referred to herein individually as "the playback chunk 192" and collectively as "the playback chunks 192." In some other embodiments, P can be any positive integer (including 2 or 3) and the personalized narrative 198 can therefore include any number of the playback chunks 192.

In some embodiments, each of the playback chunks 192(1)-192(P) is equal to a different one of the chunks 122. In the same or other embodiments, the chunks 122 in the personalized narrative 198 can be out-of-order with respect to the default narrative 124. In some embodiments, any number of the chunks 122 can be omitted from the personalized narrative 198. In the same or other embodiments, any number of the chunks 122 can be repeated within the personalized narrative 198.

When the narrative planning engine 180 adds the playback chunk 192(p), where p is any integer from 1 to P, to the personalized narrative 198, the interactive streaming application 160 transmits the playback chunk 192(p) to the client device 102. Because the narrative planning engine 180 can modify the planned narrative over time, the personalized narrative 198 specifies a dynamically determined playback order for any number of the chunks 122.

In some embodiments, the narrative planning engine 180 and/or the interactive streaming application 160 determine a playback rate (not shown) at which the narrative planning engine 180 adds new playback chunks 192 to the personalized narrative 198. The narrative planning engine 180 and/or the interactive streaming application 160 can determine the playback rate in any technically feasible fashion based on a goal of allowing the client device 102 to playback the media title 128 without interruptions. For instance, in some embodiments, the interactive streaming application 160 includes, without limitation, functionality that dynamically adapts the playback rate based on a network connection between the interactive streaming application 160 and the client device 102.

The narrative planning engine 180 can implement any number and type of algorithms (e.g., heuristics, rules, etc.) in any combination to determine when and/or how to modify the planned narrative. In some embodiments, the narrative planning engine 180 modifies the planned narrative based on any number (including none) of input states 172(1)-172(S), where S can be any positive integer greater than 1. Each of the input states 172(1)-172(S) reflects an interaction between the user 104 and the IoT device 106 while an associated and consecutive subset of the playback chunks 192 are played back for the user 104.

The IoT device 106 can be any physical object that is accessible to the user 104 and is capable of communicating with the compute instance 110(2) in any technically feasible fashion. For instance, in some embodiments, the IoT device 106 is capable of communicating with the compute instance 110(2) via, without limitation, the internet, Bluetooth, Near-Field Communication, or any combination thereof. In some embodiments, the IoT device 106 is a toy that the user 104 can interact with physically (e.g., move). For example, the IoT device 106 could be, without limitation, an action figure, a doll, a wand, a toy vehicle, a stuffed toy, a ball, or any other type of object. In some embodiments, the IoT device 106 can be any object related to the media title 128. In the same or other embodiments, the IoT device 106 can be any object that can be controlled by the user 104 to interact with the media title 128 in any technically feasible fashion. In some embodiments, the IoT device 106 is replaced with any type of physical device that is accessible to the user 104 and is capable of communicating with the compute instance 110(2) in any technically feasible fashion instead of via the internet.

The IoT device 106 can be under the control of the user 104 for any number of time intervals during the playback of the media title 128. In some embodiments, the IoT device 106 can be under the control of the user 104 during the entire playback of the media title 128. Each of the input states 172(1)-172(S) is associated with a different, nonoverlapping, time interval during the playback of the media title 128. The input states 172(1)-172(S) are also referred to herein individually as "the input state 172" and collectively as "the input states 172."

For explanatory purposes only, the playback chunks 192 are depicted within the personalized narrative 198 in a playback order along a playback timeline 194. The playback timeline 194 spans from the point in time at which the client device 102 plays back the first portion of the playback chunk 192(1) to the point in time at which the client device 102 plays back the last portion of the playback chunk 192(P).

Furthermore, the input states 172 are differentiated via parenthetical alphanumeric character(s) that identify the temporal order of the input states 172 with respect to the playback timeline 194 where needed. More specifically, the input state 172(1) is associated with an earlier time interval along the playback timeline 194 than any of the other input states 172, and the input state 172(S) is associated with a later time interval along the playback timeline 194 than any of the other input states 172.

In some embodiments, the movement recognition engine 170 generates the input states 172(1)-172(S) based on the tracking stream 108, the narrative database 120, and the personalized narrative 198. The tracking stream 108 includes, without limitation, any amount and/or type of data that indicates interactions between the user 104 and the IoT device 106. In some embodiments, the tracking stream 108 includes, without limitation, positions in space associated with the IoT device 106. In the same or other embodiments, the tracking stream 108 reflects how the user 104 moves the IoT device 106.

The tracking stream 108 can be generated in any technically feasible fashion. In some embodiments, the interactive streaming application 160, the movement recognition engine 170, a playback application executing on the client device 102, the IoT device 106, any number and types of other software applications, or any combination thereof can execute any number of tracking operations to generate the tracking stream 108. In the same or other embodiments, the IoT device 106 can be associated with any number and/or types of sensors (e.g., one or more accelerometers, gyroscopes, GPS receivers, magnetometers, etc.) that facilitate any number and/or types of tracking operations.

In some embodiments, the IoT device 106 can be associated with any number and/or types of biometric sensors (e.g., one or more pressure sensors, galvanic skin response sensors, heart rate sensors, etc.) that measure aspects of any number and/or types of behavior and/or characteristics of the user 104 to facilitate any number and/or types of biofeedback operations. For instance, in some embodiments, any number of pressure sensors embedded in the IoT device 106 enable the interactive streaming application 160 to detect when the user 104 squeezes the IoT device 106.

The movement recognition engine 170 can generate the input states 172 in any technically feasible fashion. In some embodiments, the movement recognition engine 170 repeatedly executes a state generation process to generate the input states 172(1)-172(S). During the $5^{th}$ execution of the state generation process, where s is an integer from 1 to S, the movement recognition engine 170 generates the input state 172(s).

In some embodiments, each of the input states 172 includes, without limitation, an input movement (not shown in FIG. 1) and an input narrative metadata set (not shown in FIG. 1). For each of the input states 172, the input narrative metadata set is referred to here as "associated with" the input movement and vice versa. The input movement included in the input state 172(s) is an estimated classification of the movement of the IoT device 106 that occurs during the time interval associated with the input state 172(s). In some embodiments, the input movements are specified via a consistent set of classifications that are agnostic with respect to the IoT device 106. For example, each of the input movements could specify the classification of the movement of a toy car or the movement of a wand.

In some embodiments, each of the input narrative metadata sets specifies the narrative metadata set 126 that is associated with one of the playback chunks 192 played back via the client device 102 during the associated input movement. In some embodiments, the input narrative metadata sets are specified via a consistent set of labels that are agnostic with respect to the media title 128. In some other embodiments, each of the input states 172 includes, without limitation, an input narrative metadata set list instead of the input narrative metadata set, and the techniques described herein are modified accordingly. In the same or other embodiments, each input narrative metadata set list specifies, without limitation, any number of the narrative metadata sets 126 associated with any number of the playback chunks 192 played back via the client device 102 during the associated input movement.

As described in greater detail below in conjunction with FIG. 2, to generate the input state 172(1), the movement recognition engine 170 performs any number and/or types of discretization operations on the tracking stream 108 to generate discrete inputs (not shown in FIG. 1). The movement recognition engine 170 uses a trained classifier (not shown in FIG. 1) to classify a group of one or more consecutive discrete inputs as the input movement included in the input state 172(1). The movement recognition engine 170 sets the input narrative metadata set included in the input state 172(1) equal to the narrative metadata set 126 associated with one of the playback chunks 192 played back via the client device 102 during the input movement. The movement recognition engine 170 repeatedly re-executes the state generation process until the tracking stream 108 terminates or the interactive streaming application 160 terminates the playback of the media title 128.

When the movement recognition engine 170 generates the input state 172($s$), where s is an integer from 1 to S, the interactive streaming application 160 transmits the input state 172($s$) to the narrative planning engine 180. Upon receiving the input state 172($s$), the narrative planning engine 180 determines whether and/or how to modify the planned narrative based on the input state 172($s$), the insight dataset 148, and the narrative database 120.

As described in greater detail below in conjunction with FIG. 3, in some embodiments, the narrative planning engine 180 compares the input state 172($s$) to the target states 150. If the narrative planning engine 180 determines that the input state 172($s$) matches at least one of the target states 150, then the narrative planning engine 180 does not modify the planned narrative based on the input state 172($s$). As referred to herein, the input state 172($s$) matches the target state 150($m$), where m is any integer from 1 to M, when the input movement and the input narrative metadata set included in the input state 172($s$) are equal to the target movement 152($m$) and the target narrative metadata set 154($m$), respectively.

If, however, the narrative planning engine 180 determines that the input state 172($s$) does not match at least one of the target states 150, then the narrative planning engine 180 compares the input movement included in the input state 172($s$) to the target movements 152. If the narrative planning engine 180 determines that the input movement does not match any of the target movements 152, then the narrative planning engine 180 does not modify the planned narrative based on the input state 172($s$).

Otherwise, the narrative planning engine 180 selects the target states 150 that include the target movement(s) 152 that match the input movement included in the input state 172($s$). The narrative planning engine 180 generates a narrative guidance list (not shown in FIG. 1) that includes, without limitation, the target narrative metadata set(s) 154 that are included in the selected target states 150.

The narrative planning engine 180 then attempts to modify the planned narrative to better align with at least one of the target narrative metadata sets 154 that is included in the narrative guidance list while complying with any number (including zero) of narrative rules (not shown in FIG. 1). Each of the narrative rules can specify any number and/or type of constraints associated with the planned narrative. For instance, in some embodiments, one of the narrative rules specifies that the planned narrative cannot include any immediate repetitions of any of the chunks 122.

The narrative planning engine 180 can modify the planned narrative in any technically feasible fashion. In some embodiments, the narrative planning engine 180 can move any number of the chunks 122 within the planned narrative, remove any number of the chunks 122 from the planned narrative, insert any number of the chunks 122 at any number of positions within the planned narrative, or any combination thereof.

For instance, in some embodiments, the narrative planning engine 180 can remove any number of the chunks 122 included in the planned narrative such that the narrative planning engine 180 selects the chunk 122($n$), where n is an integer from 1 to N, as the next playback chunk 192. In the same or other embodiments, the narrative planning engine 180 can prepend the chunk 122($n$) followed by any number of other chunks 122 (including zero) to the planned narrative. Importantly, the narrative metadata set 126($n$) associated with the chunk 122($n$) matches one of the target narrative metadata sets 154 included in the narrative guidance list. In this fashion, the narrative planning engine 180 modifies the planned narrative 198 to increase the proximity of input movements that match at least one of the target movements 152 to one of the associated target narrative metadata sets 154.

The narrative planning engine 180 can modify the planned narrative in response to receiving each of the input states 172(1)-172(S). Consequently, the narrative planning engine 180 can modify the planned narrative (and therefore the personalized narrative 198) from 0 to S times during the playback of the media title 128.

For example, and as depicted in italic, in some embodiments, the narrative planning engine 180 removes the chunks 122(3)-122(4) from the planned narrative (and therefore the personalized narrative 198), in response to the input state 172(1). The narrative planning engine 180 can subsequently modify the planned narrative from 0 to (S−1) more times during the playback of the media title 128 in response to receiving the input states 172(2)-172(S).

The narrative planning engine 180 and/or the interactive streaming application 160 can determine that the playback of the media title 128 is complete in any technically feasible fashion. In some embodiments, the narrative planning engine 180 determines that the playback of the media title 128 is complete after the narrative planning engine 180 appends the last chunk 122 included in the planned narrative to the personalized narrative 198.

In some embodiments, the narrative planning engine 180 determines that the playback of the media title 128 is complete based on the input states 172 and the insight dataset 148. For instance, in some embodiments, the narrative planning engine 180 determines that the playback of the media title 128 is complete when the input state 172(N) matches a completion state specified in the insight dataset 148.

Although not shown, in some embodiments, the narrative planning engine 180 generates a new training item 134 based on the input states 172(1)-172(S) and the personalized narrative 198. The narrative planning engine 180 then adds the new training item 134 to the training database 132. Subsequently, the golden path application 140 can re-generate the insight dataset 148 based on the updated training database 132.

Advantageously, because the narrative planning engine 180 tailors the personalized narrative 198 based on the movements of the IoT device 106 and the target states 150, the narrative planning engine 180 can increase the likelihood that the playback goal 188 is achieved. As persons skilled in the art will recognize, increasing the likelihood that the playback goal 188 is achieved reflects that the personalized narrative 198 better matches the preferences of the user 104 relative to the default narrative 124. The personalized narrative 198 can therefore increase the overall quality of the playback experience and/or the perceived quality of the media title 128 in the mind of the user 104 relative to the default narrative 124.

In some embodiments, the interactive streaming application 160 automatically personalizes the playback of any number of media titles 128 for any number of users 104 to reflect individual preferences of the users 104. Because the interactive streaming application 160 personalizes the playback of the media title 128 without interrupting the playback, the interactive streaming application 160 can effectively increase the overall quality of the playback experience across a broad range of users 104.

Note that the techniques described herein are illustrative rather than restrictive and can be altered without departing from the broader spirit and scope of the invention. Many modifications and variations on the functionality provided by the golden path application 140, the interactive streaming application 160, the movement recognition engine 170, and the narrative planning engine 180 will be apparent to those of ordinary skill in the art without departing from the scope and spirit of the described embodiments.

It will be appreciated that the system 100 shown herein is illustrative and that variations and modifications are possible. For example, the functionality provided by the golden path application 140, the interactive streaming application 160, the movement recognition engine 170, and the narrative planning engine 180 as described herein may be integrated into or distributed across any number of software applications (including one), and any number of components of the system 100. Further, the connection topology between the various units in FIG. 1 may be modified as desired.

Figure 2:
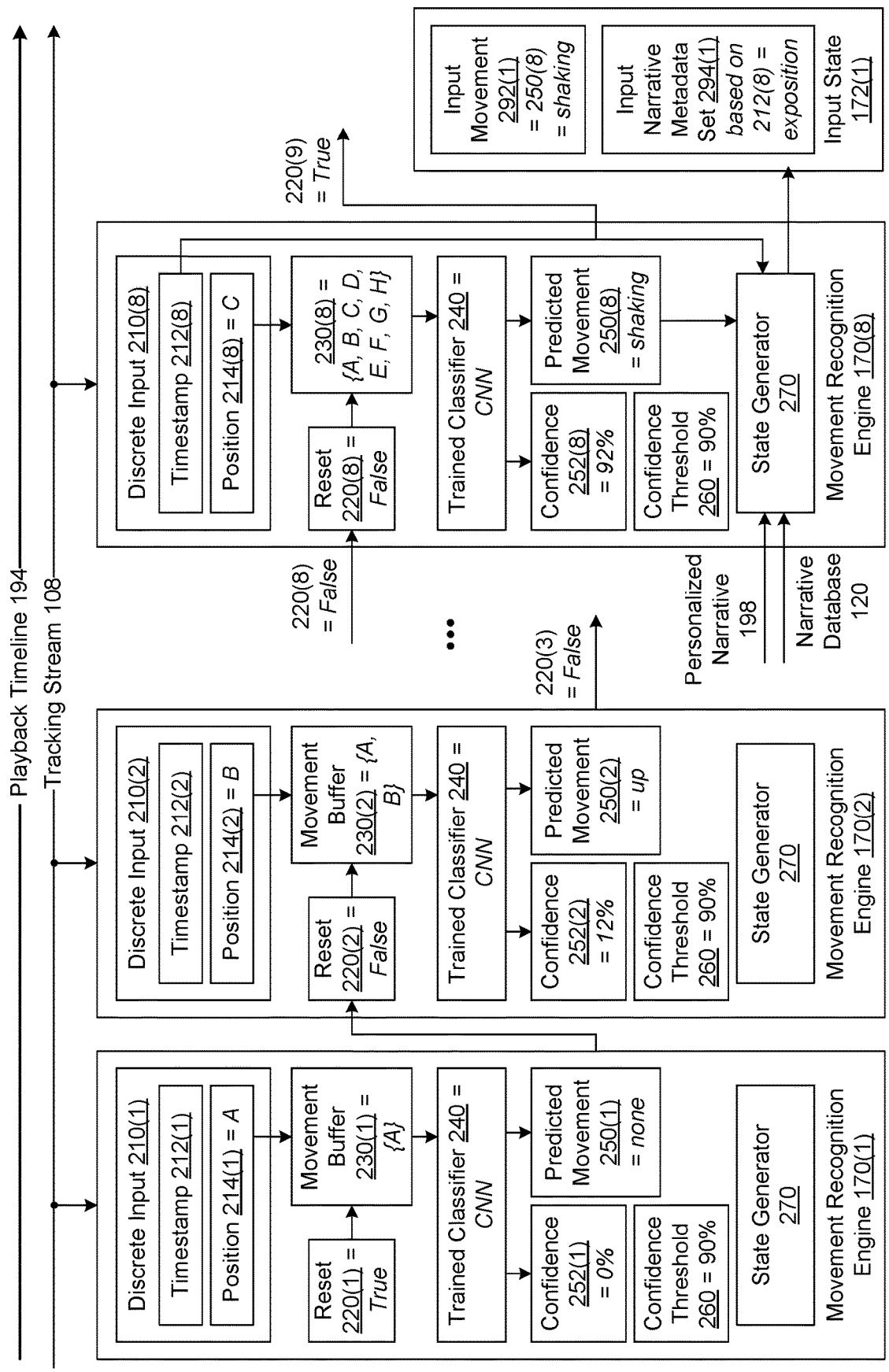
FIG. 2 illustrates a sequence of operations performed by the movement recognition engine of FIG. 1 when generating one of the input states, according to various embodiments.

FIG. 2 illustrates a sequence of operations performed by the movement recognition engine 170 of FIG. 1 when generating one of the input states 172, according to various embodiments. More precisely, FIG. 2 illustrates a sequence of operations performed by the movement recognition engine 170 when generating the input state 172(1).

As described previously herein in conjunction with FIG. 1, as the media title 128 is played back for the user 104 via the client device 102, the user 104 interacts with the IoT device 106. The tracking stream 108 tracks the IoT device 106 in real-time and includes, without limitation, positions in space associated with the IoT device 106. The movement recognition engine 170 discretizes the tracking stream 108 to generate any number of discrete inputs 210(1)-210(D), where D can be any integer that is greater than or equal to 8 (as an example) and 210(D) is not shown in FIG. 2. The discrete inputs 210(1)-210(D) are also referred to herein individually as "the discrete input 210" and collectively as "the discrete inputs 210."

The movement recognition engine 170 can discretize the tracking stream 108 in any technically feasible fashion. For instance, in some embodiments, the movement recognition engine 170 breaks the tracking stream 108 into segments in real-time, where each segment has a predetermined duration (e.g., a duration of a millisecond). The movement recognition engine 170 generates a new discrete input 210 for each segment.

As shown explicitly for the discrete inputs 210(1), 210(2), and 210(8), in some embodiments, the discrete inputs 210(1)-210(D) include, without limitation, the timestamps 212(1)-212(D) and the positions 214(1)-214(D). The timestamps 212(1)-212(D) are also referred to herein individually as "the timestamp 212" and collectively as "the timestamps 212." The positions 214(1)-214(D) are also referred to herein individually as "the position 214" and collectively as "the positions 214."

The movement recognition engine 170 determines each of the positions 214 based on the positions in space specified in the associated segment of the tracking stream 108. The movement recognition engine 170 can determine the positions 214 in any technically feasible fashion. For instance, in some embodiments, the movement recognition engine 170 sets each of the positions 214 to the average of the positions in space included in the associated segment of the tracking stream 108.

The movement recognition engine 170 sets each of the timestamps 212 equal to a playback time that corresponds to at least a portion of the associated segment of the tracking stream 108. As referred to herein, a "playback time" specifies a point in time relative to the playback timeline 194. As described previously herein in conjunction with FIG. 1, the playback timeline 194 spans from the point in time at which the client device 102 playback the first portion of the playback chunk 192(1) to the point in time at which the client device 102 plays back the last portion of the playback chunk 192(P). Accordingly, the timestamps 212(1)-212(D) indicate the playback chunks 192 that are playing back via the client device 102 when the IoT device 106 is at the positions 214(1)-214(D), respectively.

The movement recognition engine 170 and/or any number of other software applications can determine the timestamps 212(1)-212(8) in any technically feasible fashion. As described previously herein, in some embodiments, a playback application executing on the client device 102 stores one or more of the playback chunks 192 as a reserve before playing back any of the playback chunks 192. In some such embodiments, the movement recognition engine 170 can communicate with the playback application to establish a temporal mapping between the current time and the playback time. The movement recognition engine 170 can then use the temporal mapping to determine the timestamps 212.

The movement recognition engine 170 sequentially generates and processes the discrete inputs 210 to generate the input states 172. As shown, the input state 172(1) includes, without limitation, an input movement 292(1) and an input narrative metadata set 294(1). Although not shown, the input states 172(2)-172(S) include, without limitation, the input movements 292(2)-292(S), respectively, and the input narrative metadata sets 294(2)-294(S), respectively. The input movements 292(2)-292(S) are also referred to herein individually as "the input movement 292" and collectively as "the input movements 292." The input narrative metadata sets 294(2)-294(S) are also referred to herein individually as "the input narrative metadata set 294" and collectively as "the input narrative metadata sets 294."

The number of discrete inputs 210 that the movement recognition engine 170 generates and processes to determine each of the input states 172(1)-172(S) varies based on the number of discrete inputs 210 that the movement recognition engine 170 requires to reliably predict the input movements 292(1)-292(S), respectively.

Over the period of time depicted in FIG. 2, the movement recognition engine 170 sequentially and in real-time breaks the tracking stream 108 into eight segments. For each segment, the movement recognition engine 170 generates and processes a new discrete input 210 in an attempt to reliably predict the input movement 292(1). For explanatory purposes only, FIG. 2 depicts multiple snapshots of the movement recognition engine 170, where each snapshot is associated with a different point in time and a different discrete input 210. The snapshots of the movement recognition engine 170 are respectively denoted as the movement recognition engines 170(1)-170(8). Furthermore, the components of the movement recognition engines 170(1)-170(8) are denoted with the parenthetical numbers 1-8, respectively, as needed, and exemplary values for some of the components are depicted in italics.

As shown explicitly for the movement recognition engines 170(1), 170(2), and 170(8), the movement recognition engine 170 includes, without limitation, the discrete input 210, a reset 220, a movement buffer 230, a trained classifier 240, a predicted movement 250, a confidence 252, a confidence threshold 260, and a state generator 270.

The reset 220 is either true or false and indicates whether or not the movement recognition engine 170 is to evaluate the discrete input 210 with respect to previously generated discrete inputs 210. The reset 220(1) is initialized to true. In general, the movement buffer 230 includes, without limitation, an ordered list of any number of the positions 214 corresponding to the discrete inputs 210 that the movement recognition engine 170 has generated since generating the previous input state 172 (if any). At any given point in time, the positions 214 included in the movement buffer 230 are associated with the IoT device 106 across a time interval that varies over time.

The trained classifier 240 is a machine learning model that the movement recognition engine 170 uses to map the movement buffer 230 to the predicted movement 250 and the confidence 252. The trained classifier 240 can be any type of machine learning model and can be trained via any number and/or types of machine learning algorithms in any technically feasible fashion.

As depicted in italics, in some embodiments, the trained classifier 240 is a trained convolutional neural network ("CNN"). In the same or other embodiments, the trained classifier 240 can include, without limitation, a trained random forest, a trained neural network, a trained decision tree, a trained support vector machine, any other technical feasible trained machine learning model, or any combination thereof. In some embodiments, the trained classifier 240 is trained based on a training set that includes, without limitation, a set of movement sequences specifying positions of any number of IoT devices, where each movement sequence is tagged with a corresponding movement classification. In some alternate embodiments, the trained classifier 240 can be replaced or supplemented with any other type of machine learning model. For instance, in some alternate embodiments, the trained classifier 240 is replaced with a generative adversarial network, a cluster-based machine learning model, and/or a classifier ensemble in any combination.

The predicted movement 250 specifies an estimated movement of the IoT device 106 corresponding to the movement buffer 230. The confidence 252 correlates to a likelihood that the predicted movement 250 is accurate. In some alternate embodiments, the trained classifier 240 generates the predicted movement 250 but does not generate the confidence 252, and the techniques described herein are modified accordingly.

The confidence threshold 260 is a minimum threshold of the confidence 252 for which the movement recognition engine 170 generates a new input state 172. The confidence threshold 260 can be any value determined in any technically feasible fashion. As shown in the example of FIG. 2, in some embodiments, the confidence threshold 260 is 90%. If the confidence 252 does not exceed the confidence threshold 260, then the movement recognition engine 170 sets the reset 220 to false and then generates and processes a new discrete input 210.

Otherwise, as described in greater detail below, the state generator 270 generates a new input state 172 based on the predicted movement 250, the most recently generated timestamp 212, the personalized narrative 198, and the narrative database 120. In alternate embodiments, the state generator 270 can generate the new input state 172 based on any number of the timestamps 212, and the techniques described herein are modified accordingly. In the same or other alternate embodiments, the state generator 270 can generate the new input state 172 based on the predicted movement 250 and any amount and/or types of data in any technically feasible fashion.

As shown, the movement recognition engine 170(1) generates the discrete input 210(1) that includes, without limitation the timestamp 212(1) and the position 214(1) of A. Because the reset 220(1) is true, the movement recognition engine 170(1) sets the movement buffer 230(1) equal to the position 214(1) of A. The movement recognition engine 170(1) inputs the movement buffer 230(1) of {A} into the trained classifier 240. In response, the trained classifier 240 outputs the predicted movement 250(1) of none and the confidence 252(1) of 0%. Because the confidence 252(1) does not exceed the confidence threshold 260 of 90%, the movement recognition engine 170(1) sets the reset 220(2) to false.

Subsequently, the movement recognition engine 170(2) generates the discrete input 210(2) that includes, without limitation the timestamp 212(2) and the position 214(2) of B. Because the reset 220(2) is false, the movement recognition engine 170(2) appends the position 214(2) to the movement buffer 230(2). As a result, the movement buffer 230(2) is equal to {A,B}. The movement recognition engine 170(2) inputs the movement buffer 230(2) of {A,B} into the trained classifier 240. In response, the trained classifier outputs the predicted movement 250(2) of up and the confidence 252(2) of 12%. Because the confidence 252(2) does not exceed the confidence threshold 260 of 90%, the movement recognition engine 170(2) sets the reset 220(3) to false.

Although not shown, the movement recognition engines 170(3)-170(7) sequentially generate and process the discrete inputs 210(3)-210(7). As a result, the reset 220(8) is equal to false and the movement buffer 230(7) (not shown) is equal to {A,B,C,D,E,F,G}. As shown, the movement recognition engine 170(8) generates the discrete input 210(8) that includes, without limitation the timestamp 212(8) and the position 214(8) of H. Because the reset 220(8) is false, the movement recognition engine 170(8) appends the position 214(8) to the movement buffer 230(8). The movement recognition engine 170(8) inputs the movement buffer 230(8) of {A,B,C,D,E,F,G,H} into the trained classifier 240. In response, the trained classifier 240 outputs the predicted movement 250(8) of shaking and the confidence 252(8) of 92%. Because the confidence 252(8) exceeds the confidence threshold 260 of 90%, the movement recognition engine 170(8) sets the reset 220(9) to true.

The state generator 270 then generates the input state 172(1) based on the predicted movement 250(8) and the timestamp 212(8). As shown, the state generator 270 sets the input movement 292(1) equal to the predicted movement 250(8) of shaking. The state generator 270 maps the timestamp 212(8) to the playback chunk 192 playing back via the client device 102 during at least a portion of the input movement 292(1) based on the personalized narrative 198. Referring back to FIG. 1, the state generator 270 maps the timestamp 212(8) to the playback chunk 192(2) that is equal to the chunk 122(2). The state generator 270 sets the input narrative metadata set 294(1) equal to the narrative metadata set 126 that is associated with the chunk 122(2) and therefore the playback chunk 192(2). In some other embodiments, the state generator 270 can determine the input narrative metadata set 294(1) in any technically feasible fashion.

For explanatory purposes only, in the embodiment depicted in FIG. 2, the state generator 270 sets the input narrative metadata set 294(1) equal to the narrative metadata set 126(2) of exposition that is associated with the chunk 122(2). As persons skilled in the art will recognize, the input state 172(1) specifies a mapping between the input narrative metadata set 294(1) and the input movement 292(1). The input movement 292(1) therefore indicates a response of the user 104 that is associated with the input narrative metadata set 294(1).

Personalizing a Default Narrative Based on Target States

Figure 3:
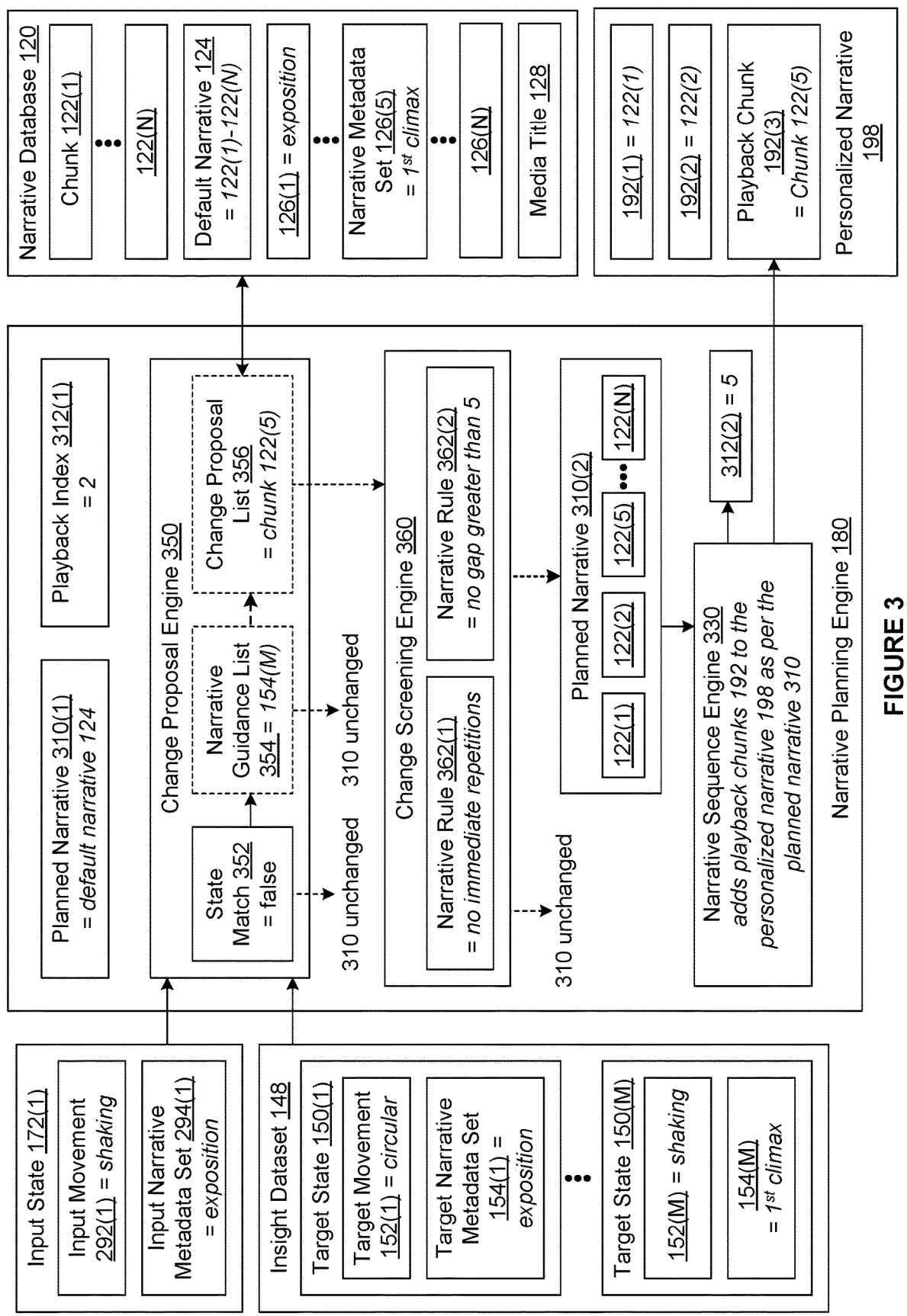
FIG. 3 is a more detailed illustration of the narrative planning engine of FIG. 1, according to various embodiments.

FIG. 3 is a more detailed illustration of the narrative planning engine 180 of FIG. 1, according to various embodiments. As described previously herein in conjunction with FIG. 1, the narrative planning engine 180 incrementally generates the personalized narrative 198 based on the narrative database 120, the input states 172(1)-172(S), and the insight dataset 148.

As shown, the narrative planning engine 180 includes, without limitation, a narrative sequence engine 330, a change proposal engine 350, and a change screening engine 360. During an initialization phase (not shown), the narrative planning engine 180 sets a planned narrative 310 (not explicitly depicted in FIG. 3) equal to the default narrative 124 and sets a playback index 312 (not explicitly depicted in FIG. 3) equal to 0. The planned narrative 310 is a tentative playback order for any number of the chunks 122.

Importantly, the narrative planning engine 180 can dynamically modify the planned narrative 310 during the playback of the media title 128. At any given point in time, the playback index 312 specifies the total number of the playback chunks 192 that are included in the personalized narrative 198. In some embodiments, at any given point in time, the planned narrative 310 specifies a sequence of the chunks 122 in streaming order, where the narrative planning engine 180 has previously streamed the chunks 122 that reside ahead of and at the playback index 312 to the client device 102. Accordingly, the chunks 122 that reside after the playback index 312 in the planned narrative 310 comprise a sequence of the chunks 122 that are to be streamed to the client device 102 for playback.

During the initialization phase, the narrative planning engine 180 causes the narrative sequence engine 330 to begin executing. The narrative sequence engine 330 iteratively and incrementally generates the personalized narrative 198 based on the planned narrative 310. The narrative sequence engine 330 can generate the personalized narrative 198 in any technically feasible fashion. For instance, in some embodiments, the narrative sequence engine 330 repeatedly increments the playback index 312, selects the chunk 122 at the playback index 312 in the planned narrative 310, and appends the selected chunk 122 to the personalized narrative 198 as a new playback chunk 192. The narrative sequence engine 330 continues to append new playback chunks 192 to the personalized narrative 198 until the narrative sequence engine 330, the narrative planning engine 180, or the interactive streaming application 160 determines that the playback of the media title 128 is complete or terminated (e.g., by the user 104 or the client device 102).

The narrative sequence engine 330, the narrative planning engine 180, or the interactive streaming application 160 can determine that the playback of the media title 128 is complete in any technically feasible fashion. For instance, in some embodiments, the narrative sequence engine 330 determines that the playback of the media title 128 is complete after the narrative sequence engine 330 appends the last chunk 122 included in the planned narrative 310 to the personalized narrative 198. In some other embodiments, the narrative planning engine 180 determines that the playback of the media title 128 is complete based on the input states 172 and the insight dataset 148.

In some embodiments, the narrative sequence engine 330, the narrative planning engine 180, and/or the interactive streaming application 160 determine a playback rate (not shown) at which the narrative sequence engine 330 adds new playback chunks 192 to the personalized narrative 198. The narrative sequence engine 330, the narrative planning engine 180, and/or the interactive streaming application 160 can determine the playback rate in any technically feasible fashion based on a goal of allowing the client device 102 to playback the media title 128 without interruptions. For instance, in some embodiments, the narrative sequence engine 330 includes, without limitation, functionality that dynamically adapts the playback rate based on a network connection between the interactive streaming application 160 and the client device 102.

After the initialization phase, upon receiving the input state 172(s), where s is an integer from 1 to S, the narrative planning engine 180 determines whether and/or how to modify the planned narrative 310 based on the input state 172(s). Consequently, the narrative planning engine 180 can modify the planned narrative 310 between zero and S times during the playback of the media title 128. The narrative planning engine 180 can determine whether and/or how to modify the planned narrative 310 based on the input state 172(s) in any technically feasible fashion.

For instance, in some embodiments, the change proposal engine 350 determines whether to generate a change proposal list 356 based on the input state 172(s), the insight dataset 148, and the narrative database 120. As shown, the change proposal engine 350 includes, without limitation, a state match 352, optionally a narrative guidance list 354, and optionally the change proposal list 356. The narrative guidance list 354 and the change proposal list 356 are depicted via dashed boxes to indicate that the change proposal engine 350 does not necessarily generate the narrative guidance list 354 and/or the change proposal list 356 based on the input state 172(s).

In some embodiments, the change proposal engine 350 performs comparison operations between the input state 172(s) and the target states 150(1)-150(M) included in the insight dataset 148 to determine whether the input state 172(s) matches any of the target states 150(1)-150(M). The change proposal engine 350 determines that the input state 150(s) matches the target state 150(m), where m is an integer that is between 1 and M, if the input movement 292(s) is equal to the target movement 152(m) and the input narrative metadata set 294(s) is equal to the target narrative metadata set 154(m).

If the change proposal engine 350 determines that the input state 172(s) matches any of the target states 150(1)-150(M), then the change proposal engine 350 sets the state match 352 to true. And, as depicted via a dashed arrow, the change proposal engine 350 generates neither the narrative guidance list 354 nor the change proposal list 356. Furthermore, the change proposal engine 350 does not modify the planned narrative 310 based on the input state 172(s).

If, however, the change proposal engine 350 determines that the input state 172(s) does not match any of the target states 150(1)-150(M), then the change proposal engine 350 sets the state match 352 to false. The change proposal engine 350 then performs comparison operations between the input movement 292(s) and the target movements 152(1)-152(M). If the change proposal engine 350 determines that the input movement 292(s) matches none of the target movements 152(1)-152(M), then the change proposal engine 350 generates neither the narrative guidance list 354 nor the change proposal list 356 (as depicted via a dashed arrow). And the narrative planning engine 180 does not modify the planned narrative 310 based on the input state 172(s).

Otherwise, the change proposal engine 350 initializes the narrative guidance list 354 and the narrative guidance list 354 to empty lists. For each of the target movements 152(m), where m is an integer between 1 and M, that matches the input movement 292(s), the change proposal engine 350 adds the target narrative metadata set 154(m) to the narrative guidance list 354. The change proposal engine 350 then performs comparison operations between each of the narrative metadata sets 126(1)-126(N) included in the narrative database 120 and each of the target narrative metadata sets 154 included in the narrative guidance list 354.

For each of the narrative metadata sets 126(n), where n is an integer between 1 and N, that matches at least one of the target narrative metadata sets 154 included in the narrative guidance list 354, the change proposal engine 350 adds a proposed change (not shown) associated with the chunk 122(n) to the change proposal list 356. Notably, in some embodiments, the proposed change associated with the chunk 122(n) is intended to cause the chunk 122(n) to be the next playback chunk 192 that is added to the personalized narrative 198 and therefore the next chunk 122 that is streamed to the client device 102.

Each of the proposed changes can specify any number and/or types of modifications to the planned narrative 310 in any technically feasible fashion. In some embodiments, each of the proposed changes can specify that the narrative planning engine 180 move any number of the chunks 122 within the planned narrative 310, remove any number of the chunks 122 from the planned narrative 310, insert any number of the chunks 122 at any number of positions within the planned narrative 310, or any combination thereof.

If the change proposal engine 350 generates the change proposal list 356, then the change screening engine 360 determines whether to modify the planned narrative 310 as per one of the proposed changes included in the change proposal list 356. As shown, in some embodiments, the change screening engine 360 includes, without limitation, a narrative rule 362(1) and a narrative rule 362(2). The narrative rules 362(1) and 362(2) are also referred to herein individually as "the narrative rule 362" and collectively as "the narrative rules 362." Each of the narrative rules 362 specifies a rule that constrains the planned narrative 310.

The change screening engine 360 can determine whether to modify the planned narrative 310 as per one of the proposed changes included in the change proposal list 356 in any technically feasible fashion. In some embodiments, the change screening engine 360 evaluates the planned narrative 310 in conjunction with the change proposal list 356 and the narrative rules 362 to optionally modify the planned narrative 310 as per one of the change proposal(s) included in the change proposal list 356.

For instance, in some embodiments, for each of the proposed changes specified in the change proposal list 356, the change screening engine 360 applies the proposed change to a different copy of the planned narrative 310 to generate an unfiltered narrative (not shown). The change screening engine 360 then filters the unfiltered narratives based on the narrative rules 362 to determine any number (including zero) of filtered narratives (not shown) that each comply with the narrative rules 362. A filtered narrative complies with the narrative rules 362 when streaming each of the chunks 122 as the playback chunks 192 to the client device 104 as per the filtered narrative would comply with the narrative rules 362. If the change screening engine 360 does not generate any filtered narratives, then the narrative planning engine 180 does not modify the planned narrative 310 based on the input state 172(s) (depicted via a dashed arrow).

If, however, the change screening engine 360 generates one or more filtered narratives, then the change screening engine 360 selects one of the filtered narratives based on any number and type of algorithms (e.g., heuristics, rules, etc.) in any combination. For instance, in some embodiments, the change screening engine 360 selects the filtered narrative having the smallest gap between the chunk 122 at the playback index 312 in the filtered narrative and the subsequent chunk in the filtered narrative. The change screening engine 360 then sets the planned narrative 310 equal to the selected filtered narrative. Because the narrative sequence engine 330 determines the playback chunks 192 based on the planned narrative 310, the personalized narrative 198 is modified based on the input state 172(s).

For explanatory purposes only, FIG. 3 depicts how the narrative planning engine 180 modifies the planned narrative 310 based on the input state 172(1) in some embodiments. Before receiving the input state 172(1), the narrative planning engine 180 sets the planned narrative 310 equal to the default narrative 124 that specifies, sequentially, the chunks 122(1)-122(N). Furthermore, the narrative sequence engine 330 appends the chunks 122(1) and 122(2) to the personalized narrative 198 and, therefore, the playback index 312 is equal to 2.

Snapshots of the planned narrative 310 and the playback index 312 before the narrative planning engine 180 receives the input state 172(1) are depicted and also referred to herein as the planned narrative 310(1) and playback index 312(1), respectively. For explanatory purposes only, some exemplary values are depicted in italics.

As depicted in italics, in some embodiments, the input state 172(1) includes, without limitation, the input movement 292(1) of shaking and the input narrative metadata set 294(1) of exposition. Upon receiving the input state 172(1), the change proposal engine 350 determines that the input state 172(1) does not match any of the target states 150(1)-150(M). Consequently, the change proposal engine 350 sets the state match 352 to false. The change proposal engine 350 then compares the input movement 292(1) of shaking to each of the target movements 152(1)-152(M). The change proposal engine 350 determines that the input movement 292(1) of shaking does not match any of the target movements 152(1)-152(M-1) and matches the target movement 152(M). As depicted in italics, the change proposal engine 350 therefore generates the narrative guidance list 354 that includes, without limitation, the target narrative metadata set 154(M) of $1^{st}$ climax.

The change proposal engine 350 determines that the target narrative metadata set 154(M) of $1^{st}$ climax included in the narrative guidance list 354 does not match any of the narrative metadata sets 126(1)-126(4), matches the narrative metadata set 126(5), and does not match any of the narrative metadata sets 126(6)-126(N). Consequently, the change proposal engine 350 generates the change proposal list 356 that includes, without limitation, a proposed change associated with the chunk 122(5). The proposed change specifies that the chunk 122(5) is to be the next playback chunk 192 that is added to the personalized narrative 198.

Based on the change proposal list 356, the change screening engine 360 generates an unfiltered narrative in which the chunks 122(3)-122(4) are skipped relative to the default narrative 124. The change screening engine 360 then filters the unfiltered narrative based on the narrative rules 362. As shown, the narrative rule 362(1) specifies that the planned narrative 310 cannot include any immediate repetitions of any of the chunks 122. The narrative rule 362(2) specifies that the planned narrative 310 cannot include any gaps of greater than five of the chunks 122 relative to the default narrative 124.

Because the unfiltered narrative complies with the narrative rules 362, the change screening engine 360 sets a filtered narrative equal to the unfiltered narrative. As depicted via a snapshot of the planned narrative 310 denoted and also referred to herein as the planned narrative 310(2), the change screening engine 360 sets the planned narrative 310 equal to the filtered narrative that specifies, sequentially, the chunks 122(1)-122(2), and 122(5)-122(N).

Subsequently, and as depicted via a snapshot of the playback index 312 denoted and also referred to herein as the playback index 312(2), the narrative sequence engine 330 increments the playback index 312 to 3. The narrative sequence engine 330 then selects the chunk 122(5) at the playback index 312 of 3 in the planned narrative 310(2) and appends the chunk 122(5) to the personalized narrative 198 as the playback chunk 192(3).

Notably, the playback chunk 192(3) is associated with the narrative metadata set 126(5) of $1^{st}$ climax. The narrative planning engine 180 has therefore skipped the chunks 122(3)-122(4) to more closely align the personalized narrative 198 to the target state 150(M). More precisely, the input movement 292(1) is associated with the target movement 152(M) of shaking, and the playback chunk 192(3) is associated with the target narrative metadata set 154(M) of $1^{st}$ climax.

In some other embodiments, the narrative planning engine 180 can perform any number and/or types of operations based on any number and/or types of algorithms to guide the personalized narrative 198 based on the input states 172 and any amount and/or types of data included in the insight dataset 148. For instance, in some embodiments, the insight dataset 148 includes, without limitation, any number of target state sequences (not shown). Upon receiving a new input state 172, the change proposal engine 350 generates any number and/or lengths of input state sequences based on the new input state 172 and any number of previous input states 172. The change proposal engine 350 then performs any number and/or types of sequence matching operations between the target state sequences and the input state sequences to determine the change proposal list 356.

Figure 4A:
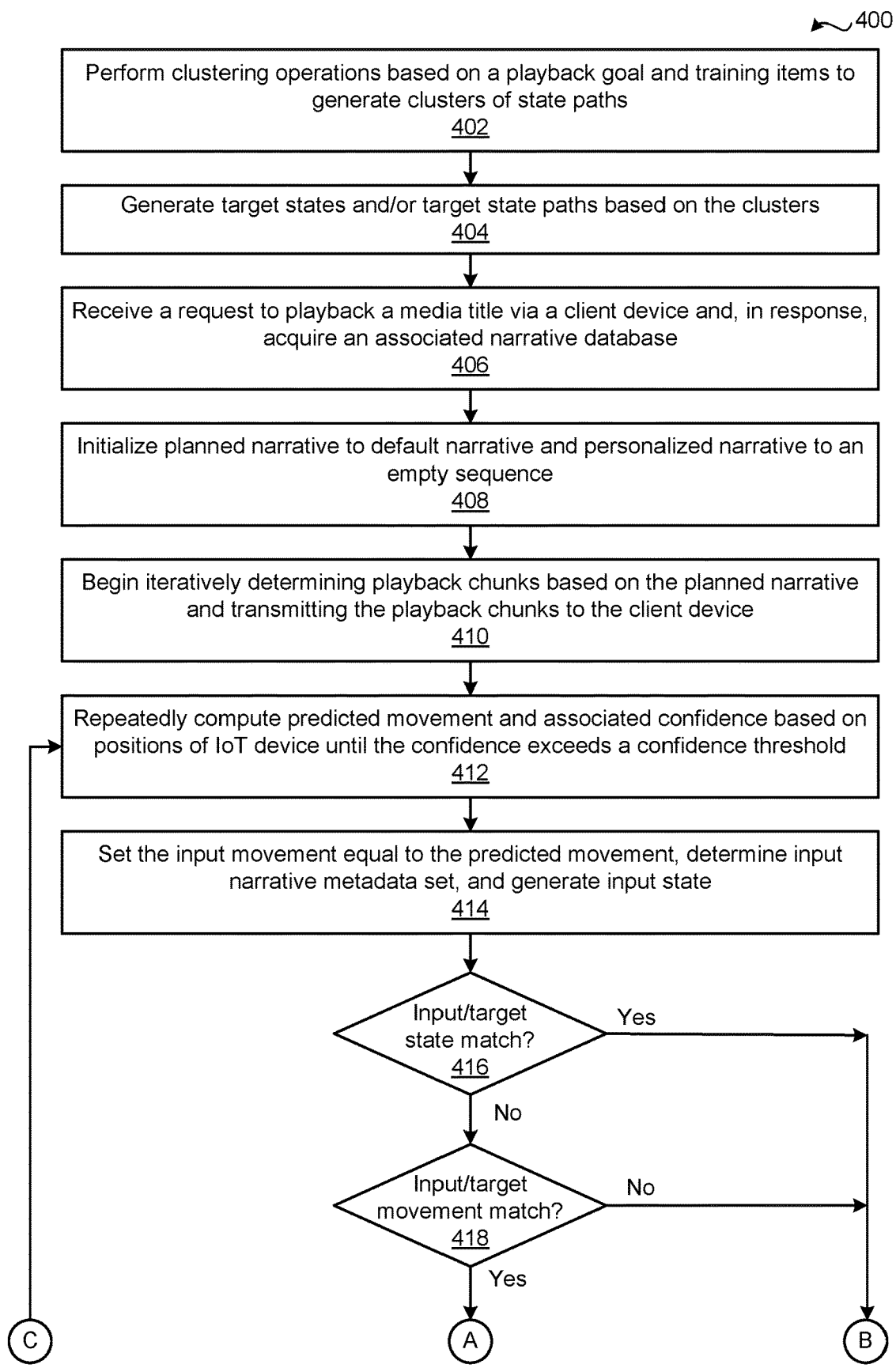
FIG. 4A is a portion of a flow diagram of method steps for playing back a media title based on user interactions with an IoT device, according to various embodiments.
Figure 4B:
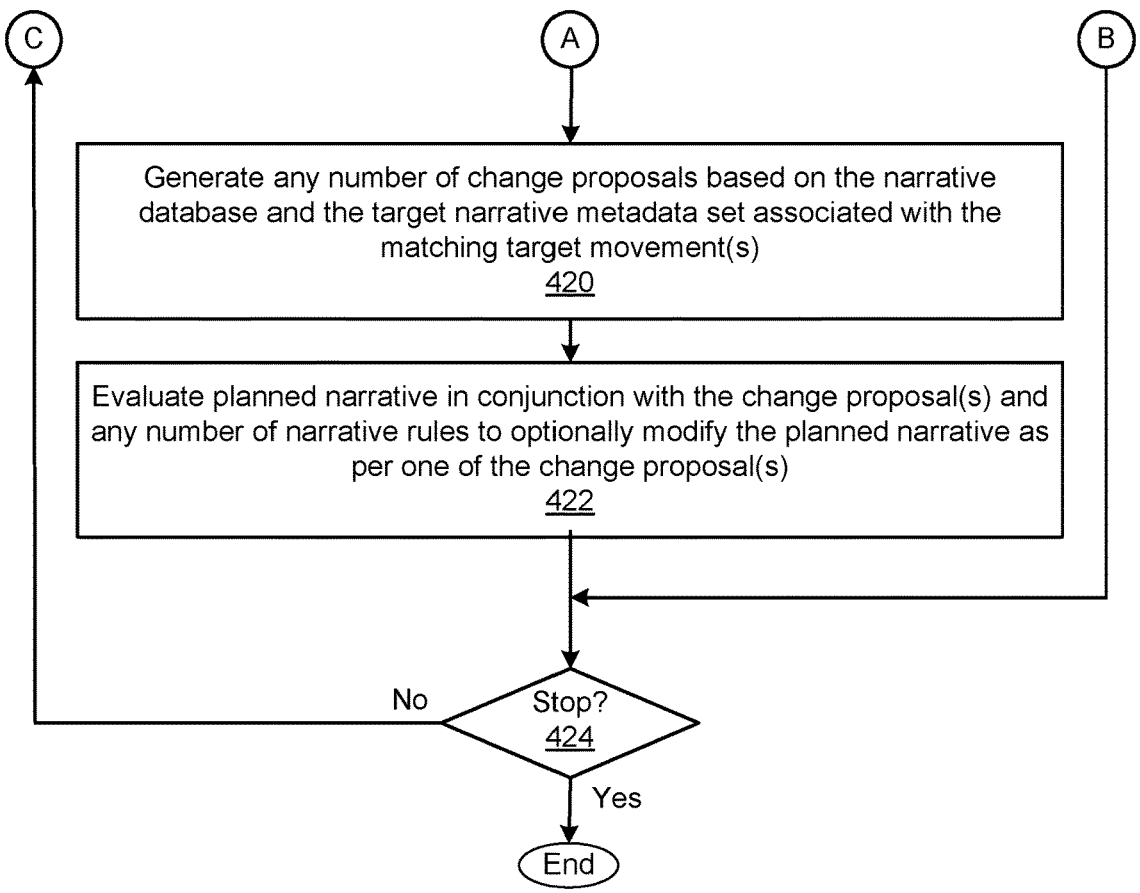
FIG. 4B is another portion of the flow diagram of method steps for playing back a media title based on user interactions with an IoT device, according to various embodiments.

FIGS. 4A-4B set forth a flow diagram of method steps for playing back a media title based on user interactions with an IoT device, according to various embodiments. Although the method steps are described with reference to the systems of FIGS. 1-3, persons skilled in the art will understand that any system configured to implement the method steps, in any order, falls within the scope of the present invention.

As shown, a method 400 begins a step 402, where the clustering engine 142 performs any number and/or types of clustering operations based on the playback goal 188 and the training items 134 to generate clusters of the state paths 138. At step 404, the insight engine 144 generates the target states 150 and/or target state paths based on the clusters.

At step 406, the interactive streaming application 160 receives a request to playback the media title 128 via the client device 102 and, in response, acquires the narrative database 120 associated with the media title 128. At step 408, the narrative planning engine 180 initializes the planned narrative 310 to the default narrative 124 and initializes the personalized narrative 198 to an empty sequence. At step 410, the narrative sequence engine 330 begins iteratively determining the playback chunks 192 based on the planned narrative 310, and the interactive streaming application 160 transmits the playback chunks 192 to the client device 102.

At step 412, the movement recognition engine 170 repeatedly computes the predicted movement 250 and the confidence 252 based on the positions of the IoT device 106 until the confidence 252 exceeds the confidence threshold 260. At step 414, the movement recognition engine 170 sets the input movement 292 equal to the predicted movement 250, determines the input narrative metadata set 294 associated with the input movement 292, and generates the input state 172 that includes, without limitation, the input movement 292 and the input narrative metadata set 294.

At step 416, the change proposal engine 350 determines whether the input state 172 matches any of the target states 150. If, at step 416, the change proposal engine 350 determines that the input state 172 matches at least one of the target states 150, then the method 400 proceeds directly to step 424 (path B), where the interactive streaming application 160 determines whether to stop playing back the media title 128.

If, however, at step 416, the change proposal engine 350 determines that the input state 172 matches none of the target states 150, then the method 400 proceeds to step 418. At step 418, the change proposal engine 350 determines whether the input movement 292 matches any of the target movements 152. If, at step 418, the change proposal engine 350 determines that the input movement 292 matches none of the target movements 152, then the method 400 proceeds directly to step 424 (path B), where the interactive streaming application 160 determines whether to stop playing back the media title 128.

If, at step 418, the change proposal engine 350 determines that the input movement 292 matches at least one of the target movements 152, then the method 400 proceeds to step 420 (path A). At step 420, the change proposal engine 350 generates any number of change proposals based on the narrative database 120 and the target narrative metadata set(s) 154 associated with the target movements 152 that match the input movement 292. At step 422, the change screening engine 360 evaluates the planned narrative 310 in conjunction with the change proposal(s) and the narrative rules 362 to optionally modify the planned narrative 310 as per one of the change proposal(s).

At step 424, the interactive streaming application 160 determines whether to stop playing back the media title 128. If, at step 424, the interactive streaming application 160 determines not to stop playing back the media title 128, then the method 400 returns to step 412 (path C), where the interactive streaming application 160 continues to personalize the playback of the media title 128 based on the movements of the IoT device 106. If, however, at step 424, the interactive streaming application 160 determines to stop playing back the media title 128, then the method 400 terminates.

In sum, the disclosed techniques enable automatic, real-time personalization of narratives of media titles for individual users. In some embodiments, during an offline training phase, a golden path application generates an insight dataset based on a training database that is associated with a narrative database for a media title and any number of historical playback sessions. Subsequently, during a real-time personalization phase, an interactive streaming application personalizes a playback of the media title for a user based on the narrative database, the insight dataset, and interactions between the user and an IoT device.

In some embodiments, the narrative database includes, without limitation, the media title, any number of chunks associated with the media title, a default narrative, and a different narrative metadata set for each of the chunks. The default narrative specifies a linear sequence of any number of the chunks. Each of the narrative metadata sets specifies any number of characteristics of the associated chunk. During each of the historical playback sessions, at least a portion of the chunks are played back for an associated user via any type of device (e.g., a laptop computer). As the device plays back the chunks, the user can physically move a tracked device.

In some embodiments, the training database includes, without limitation, a playback goal that is related to user interest and a different training item for each of the historical playback sessions. Each training item includes, without limitation, a playback metric value that quantifies the historical playback session relative to the playback goal and a state path. Each state path includes, without limitation, a sequence of training states that are associated with different, nonoverlapping time intervals during the associated historical playback session. Each training state includes, without limitation, the narrative metadata set associated with one of the chunks played back at the associated time interval during the associated historical playback session and a movement of the associated tracked device that occurs during the same time interval.

In some embodiments, the golden path application includes without limitation, a clustering engine and an insight engine. The clustering engine filters the state paths included in the training database based on the playback goal and the playback metric values to generate a successful subset of state paths that are associated with the historical playback sessions that achieved the playback goal. The clustering engine then performs clustering operations on the successful subset of state paths to generate any number of clusters. Each cluster includes, without limitation, a different state path that is the cluster seed and any number (including zero) of other state paths that are supersets of the cluster seed.

For each cluster, the insight engine selects each of the training states that is shared by at least a predetermined number of the state paths included in the cluster. The insight engine deduplicates the selected training states and generates the insight dataset based on the remaining selected training states. More specifically, for each of the remaining selected training states, the insight engine generates a target state that includes a target movement that is equal to the training movement of the selected training state and a target narrative metadata set that is equal to the training narrative metadata set of the selected training state. The insight engine then generates the insight dataset that includes, without limitation, the target states.

In some embodiments, the interactive streaming application includes, without limitation, a narrative planning engine and a movement recognition engine. In response to a request to playback the media title for a user, the narrative planning engine sets a personalized narrative to an empty sequence, a planned narrative equal to the default narrative, and a playback index to zero. At a playback rate, the narrative planning engine repeatedly increments the playback index, sets a new playback chunk equal to the chunk at the playback index in the planned narrative, and adds the new playback chunk to the personalized narrative. When the narrative planning engine appends a new playback chunk to the personalized narrative, the interactive streaming application transmits the playback chunk to a client device that subsequently plays back the playback chunk to the user.

As the client device plays back the playback chunks, the user can physically move the IoT device. Based on the positions of the IoT device over time, the movement recognition engine uses a trained classifier to generate predicted movements and associated confidences. Whenever the trained classifier generates a predicted movement associated with a confidence that exceeds a confidence threshold, the movement recognition engine generates a new input state that includes, without limitation, an input movement and an input narrative metadata set. The movement recognition engine sets the input movement equal to the predicted movement and sets the input narrative metadata set equal to the narrative metadata set associated with one of the playback chunks played back during the input movement.

When the movement recognition engine generates a new input state, the interactive streaming application transmits the input state to the narrative planning engine. The narrative planning engine compares the input state to the target states. If the narrative planning engine determines that the input state matches none of the target states, then the narrative planning engine compares the input movement included in the input state to the target movements included in the target states. If the narrative planning engine identifies one or more matching target movements, then the narrative planning engine generates a narrative guidance list. The narrative guidance list includes, without limitation, the target narrative metadata sets that are associated with the matching target movements.

The narrative planning engine then attempts to modify the planned narrative to better align with at least one of the target narrative metadata sets that are included in the narrative guidance list while complying with any number (including zero) of narrative rules. For instance, the narrative planning engine could remove any number of chunks included in the planned playback and/or pretend any number of chunks to the planned playback such that the narrative metadata set associated with the next playback chunk matches one of the target narrative metadata sets included in the narrative guidance list.

At least one technical advantage of the disclosed techniques relative to the prior art is that, with the disclosed techniques, a playback of a given media title can be personalized automatically for different users. More specifically, for each user, the interactive streaming application dynamically generates the personalized narrative that controls the playback of the media title based on interactions between the user and an IoT device. Consequently, the overall quality of the playback experience for a given media title can be increased across a broad range of users. Further, because the interactive streaming application generates each personalized narrative based on target states that are associated with user interest, the interactive streaming application also can increase the perceived quality of a media title in the minds of users. These technical advantages provide one or more technological improvements over prior art techniques.

1. In some embodiments, a computer-implemented method for playing back a media title comprises determining a first movement of an internet of things ("IoT") device, while a client device plays back a first chunk of the media title, determining, from a plurality of target states, a first target state that is associated with the first movement, determining, based on the first target state, a second chunk of the media title that should be a next chunk of the media title streamed to the client device for playback, and in response to determining that the second chunk should be the next chunk of the media title to be streamed to the client device for playback, causing the second chuck of the media title to be streamed to the client device.

2. The computer-implemented method of clause 1, wherein determining the first target state comprises determining that no target state included in the plurality of target states is associated with both the first movement and a first narrative metadata set that is associated with the first chunk of the media title, and performing one or more comparison operations between the first movement and the plurality of target states to determine that the first target state is associated with the first movement.

3. The computer-implemented method of clauses 1 or 2, wherein determining the second chunk of the media title comprises performing one or more comparison operations between a first narrative metadata set associated with the first target state and a plurality of narrative metadata sets associated with a plurality of chunks of the media title to determine that the second chunk of the media title is associated with the first narrative metadata set.

4. The computer-implemented method of any of clauses 1-3, wherein the first narrative metadata set specifies at least one of a part of a narrative, a genre, or a chronological point in time associated with the media title.

5. The computer-implemented method of any of clauses 1-4, wherein causing the second chunk of the media title to be streamed to the client device comprises removing at least one chunk of the media title from a sequence of chunks of the media title that is to be streamed to the client device for playback, wherein the at least one chunk resides ahead of the second chunk in a streaming order of the sequence of chunks.

6. The computer-implemented method of any of clauses 1-5, further comprising performing at least one clustering operation on a plurality of state paths associated with the media title to determine a plurality of clusters, wherein each state path included in the plurality of state paths is associated with a different historical playback session that achieved a given playback goal, and performing at least one analysis operation on the plurality of clusters to generate the plurality of target states.

7. The computer-implemented method of any of clauses 1-6, wherein determining the first movement comprises inputting a plurality of positions associated with the IoT device across a time interval into a trained classifier that, in response, outputs a classification of the first movement.

8. The computer-implemented method of any of clauses 1-7, wherein the trained classifier comprises at least one of a trained neural network, a trained decision tree, a trained random forest, or a trained support vector machine.

9. The computer-implemented method of any of clauses 1-8, wherein the IoT device comprises a toy that is under control of a user associated with the client device.

10. The computer-implemented method of any of clauses 1-9, wherein the media title comprises a feature-length film, a short film, an episode of a show, a recording of a sports event, or a recording of a music event.

11. In some embodiments, one or more non-transitory computer readable media include instructions that, when executed by one or more processors, cause the one or more processors to playback a media title by performing the steps of determining a first movement of an internet of things ("IoT") device, while a client device plays back a first chunk of the media title, determining, from a plurality of target states, a first target state that is associated with the first movement, determining, based on the first target state, a second chunk of the media title that should be a next chunk of the media title streamed to the client device for playback, and in response to determining that the second chunk should be the next chunk of the media title to be streamed to the client device for playback, causing the second chuck of the media title to be streamed to the client device.

12. The one or more non-transitory computer readable media of clause 11, wherein determining the first target state comprises determining that no target state included in the plurality of target states is associated with both the first movement and a first narrative metadata set that is associated with the first chunk of the media title, and performing one or more comparison operations between the first movement and the plurality of target states to determine that the first target state is associated with the first movement.

13. The one or more non-transitory computer readable media of clauses 11 or 12, wherein determining the second chunk of the media title comprises performing one or more comparison operations between a first narrative metadata set associated with the first target state and a plurality of narrative metadata sets associated with a plurality of chunks of the media title to determine that the second chunk of the media title is associated with the first narrative metadata set, and confirming that specifying the second chunk of the media title as the next chunk of the media title that is to be streamed to the client device complies with one or more narrative rules.

14. The one or more non-transitory computer readable media of any of clauses 11-13, wherein the first narrative metadata set specifies at least one of a part of a narrative, a genre, or a chronological point in time associated with the media title.

15. The one or more non-transitory computer readable media of any of clauses 11-14, wherein causing the second chunk of the media title to be streamed to the client device comprises removing at least one chunk of the media title from a sequence of chunks of the media title that is to be streamed to the client device for playback, wherein the at least one chunk resides ahead of the second chunk in a streaming order of the sequence of chunks.

16. The one or more non-transitory computer readable media of any of clauses 11-15, further comprising performing at least one clustering operation on a plurality of state paths associated with the media title to determine a plurality of clusters, wherein each state path included in the plurality of state paths is associated with a different historical playback session that achieved a given playback goal, and performing at least one analysis operation on the plurality of clusters to generate the plurality of target states.

17. The one or more non-transitory computer readable media of any of clauses 11-16, wherein determining the first movement comprises inputting a plurality of positions associated with the IoT device across a time interval into a trained classifier that, in response, outputs a classification of the first movement.

18. The one or more non-transitory computer readable media of any of clauses 11-17, wherein determining the first movement comprises computing a first confidence based on a first buffer of positions associated with the IoT device, determining that the first confidence does not exceed a confidence threshold, adding a new position associated with the IoT device to the first buffer of positions to generate a second buffer of positions, and computing a classification of the first movement based on the second buffer of positions.

19. The one or more non-transitory computer readable media of any of clauses 11-18, wherein chunks of the media title are streamed to the client device in accordance with a personalized narrative, and causing the second chunk to be streamed to the client device comprises appending the second chunk to the personalized narrative.

20. In some embodiments, a system comprises one or more memories storing instructions and one or more processors coupled to the one or more memories that, when executing the instructions, perform the steps of determining a first movement of an internet of things ("IoT") device, while a client device plays back a first chunk of a media title, determining, from a plurality of target states, a first target state that is associated with the first movement, determining, based on the first target state, a second chunk of the media title that should be a next chunk of the media title streamed to the client device for playback, and in response to determining that the second chunk should be the next chunk of the media title to be streamed to the client device for playback, causing the second chuck of the media title to be streamed to the client device.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for playing back a media title, the method comprising:
   determining a first movement of an internet of things ("IoT") device, while a client device plays back a first chunk of the media title;
   determining, from a plurality of target states, a first target state that is associated with the first movement;
   determining, based on the first target state, a second chunk of the media title that should be a next chunk of the media title streamed to the client device for playback;
   in response to determining that the second chunk should be the next chunk of the media title to be streamed to the client device for playback, causing the second chunk of the media title to be streamed to the client device; and
   iteratively streaming selected chunks of the media title to the client device based on movements of the IoT device at a playback rate that is determined based on a network connection with the client device.

2. The computer-implemented method of claim 1, wherein determining the first target state comprises:
   determining that no target state included in the plurality of target states is associated with both the first movement and a first narrative metadata set that is associated with the first chunk of the media title; and
   performing one or more comparison operations between the first movement and the plurality of target states to determine that the first target state is associated with the first movement.

3. The computer-implemented method of claim 1, wherein determining the second chunk of the media title comprises performing one or more comparison operations between a first narrative metadata set associated with the first target state and a plurality of narrative metadata sets associated with a plurality of chunks of the media title to determine that the second chunk of the media title is associated with the first narrative metadata set.

4. The computer-implemented method of claim 3, wherein the first narrative metadata set specifies at least one of a part of a narrative, a genre, or a chronological point in time associated with the media title.

5. The computer-implemented method of claim 1, wherein causing the second chunk of the media title to be streamed to the client device comprises removing at least one chunk of the media title from a sequence of chunks of the media title that is to be streamed to the client device for playback, wherein the at least one chunk resides ahead of the second chunk in a streaming order of the sequence of chunks.

6. The computer-implemented method of claim 1, further comprising:
   performing at least one clustering operation on a plurality of state paths associated with the media title to determine a plurality of clusters, wherein each state path included in the plurality of state paths is associated with a different historical playback session that achieved a given playback goal; and
   performing at least one analysis operation on the plurality of clusters to generate the plurality of target states.

7. The computer-implemented method of claim 1, wherein determining the first movement comprises inputting a plurality of positions associated with the IoT device across a time interval into a trained classifier that, in response, outputs a classification of the first movement.

8. The computer-implemented method of claim 7, wherein the trained classifier comprises at least one of a trained neural network, a trained decision tree, a trained random forest, or a trained support vector machine.

9. The computer-implemented method of claim 1, wherein the IoT device comprises a toy that is under control of a user associated with the client device.

10. The computer-implemented method of claim 1, wherein the media title comprises a feature-length film, a short film, an episode of a show, a recording of a sports event, or a recording of a music event.

11. One or more non-transitory computer readable media including instructions that, when executed by one or more processors, cause the one or more processors to playback a media title by performing the steps of:
    determining a first movement of an internet of things ("IoT") device, while a client device plays back a first chunk of the media title;
    determining, from a plurality of target states, a first target state that is associated with the first movement;
    determining, based on the first target state, a second chunk of the media title that should be a next chunk of the media title streamed to the client device for playback;
    in response to determining that the second chunk should be the next chunk of the media title to be streamed to the client device for playback, causing the second chunk of the media title to be streamed to the client device; and
    iteratively streaming selected chunks of the media title to the client device based on movements of the IoT device at a playback rate that is determined based on a network connection with the client device.

12. The one or more non-transitory computer readable media of claim 11, wherein determining the first target state comprises:
    determining that no target state included in the plurality of target states is associated with both the first movement and a first narrative metadata set that is associated with the first chunk of the media title; and
    performing one or more comparison operations between the first movement and the plurality of target states to determine that the first target state is associated with the first movement.

13. The one or more non-transitory computer readable media of claim 11, wherein determining the second chunk of the media title comprises:
    performing one or more comparison operations between a first narrative metadata set associated with the first target state and a plurality of narrative metadata sets associated with a plurality of chunks of the media title to determine that the second chunk of the media title is associated with the first narrative metadata set; and
    confirming that specifying the second chunk of the media title as the next chunk of the media title that is to be streamed to the client device complies with one or more narrative rules.

14. The one or more non-transitory computer readable media of claim 13, wherein the first narrative metadata set specifies at least one of a part of a narrative, a genre, or a chronological point in time associated with the media title.

15. The one or more non-transitory computer readable media of claim 11, wherein causing the second chunk of the media title to be streamed to the client device comprises removing at least one chunk of the media title from a sequence of chunks of the media title that is to be streamed to the client device for playback, wherein the at least one chunk resides ahead of the second chunk in a streaming order of the sequence of chunks.

16. The one or more non-transitory computer readable media of claim 11, further comprising:
   performing at least one clustering operation on a plurality of state paths associated with the media title to determine a plurality of clusters, wherein each state path included in the plurality of state paths is associated with a different historical playback session that achieved a given playback goal; and
   performing at least one analysis operation on the plurality of clusters to generate the plurality of target states.

17. The one or more non-transitory computer readable media of claim 11, wherein determining the first movement comprises inputting a plurality of positions associated with the IoT device across a time interval into a trained classifier that, in response, outputs a classification of the first movement.

18. The one or more non-transitory computer readable media of claim 11, wherein determining the first movement comprises:
   computing a first confidence based on a first buffer of positions associated with the IoT device;
   determining that the first confidence does not exceed a confidence threshold;
   adding a new position associated with the IoT device to the first buffer of positions to generate a second buffer of positions; and
   computing a classification of the first movement based on the second buffer of positions.

19. The one or more non-transitory computer readable media of claim 11, wherein chunks of the media title are streamed to the client device in accordance with a personalized narrative, and causing the second chunk to be streamed to the client device comprises appending the second chunk to the personalized narrative.

20. A system comprising:
   one or more memories storing instructions; and
   one or more processors coupled to the one or more memories that, when executing the instructions, perform the steps of:
      determining a first movement of an internet of things ("IoT") device, while a client device plays back a first chunk of a media title;
      determining, from a plurality of target states, a first target state that is associated with the first movement;
      determining, based on the first target state, a second chunk of the media title that should be a next chunk of the media title streamed to the client device for playback;
      in response to determining that the second chunk should be the next chunk of the media title to be streamed to the client device for playback, causing the second chunk of the media title to be streamed to the client device; and
      iteratively streaming selected chunks of the media title to the client device based on movements of the IoT device at a playback rate that is determined based on a network connection with the client device.

* * * * *